(12) United States Patent
Lee

(10) Patent No.: US 10,541,838 B2
(45) Date of Patent: Jan. 21, 2020

(54) METHOD AND APPARATUS FOR CHANNEL ESTIMATION IN WIRELESS COMMUNICATION SYSTEM

(71) Applicant: Samsung Electronics Co., Ltd., Suwon-si, Gyeonggi-do (KR)

(72) Inventor: Dongjae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/962,926

(22) Filed: Apr. 25, 2018

(65) Prior Publication Data

US 2018/0309599 A1 Oct. 25, 2018

(30) Foreign Application Priority Data

Apr. 25, 2017 (KR) ........................ 10-2017-0053074

(51) Int. Cl.
*H04L 25/02* (2006.01)
*H04B 7/0413* (2017.01)
*H04L 5/00* (2006.01)

(52) U.S. Cl.
CPC ....... *H04L 25/0224* (2013.01); *H04B 7/0413* (2013.01); *H04L 5/0048* (2013.01); *H04L 25/0204* (2013.01)

(58) Field of Classification Search
CPC .. H04B 7/0413; H04B 7/0617; H04B 7/0626; H04B 17/364; H04L 5/0048;
(Continued)

(56) References Cited

U.S. PATENT DOCUMENTS

2006/0029279 A1  2/2006 Donoho
2006/0222119 A1* 10/2006 Kakura ............... H04L 25/0224
                                                           375/346
(Continued)

OTHER PUBLICATIONS

Donoho, David L., et al., "Sparse Solution of Underdetermined Systems of Linear Equations by Stagewise Orthogonal Matching Pursuit," IEEE Transactions on Information Theory, vol. 58, No. 2, Feb. 2012, 28 pages.

(Continued)

*Primary Examiner* — David B Lugo

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method and an apparatus for channel estimation in a wireless communication system are provided. According to various embodiments of the present disclosure, an method of a receiving apparatus in a wireless communication system includes: estimating channel tap values by using a first reference signal; and estimating an effective channel regarding a second reference signal, based on channel tap indexes corresponding to values greater than or equal to a threshold from among the channel tap values. According to various embodiments of the present disclosure, the receiving apparatus can more exactly estimate an effective channel, and can achieve a lower BLER even in a high SNR region.

18 Claims, 12 Drawing Sheets

(58) Field of Classification Search
CPC ... H04L 5/005; H04L 5/0051; H04L 25/0204; H04L 25/0224
See application file for complete search history.

(56) References Cited

U.S. PATENT DOCUMENTS

| | | | |
|---|---|---|---|
| 2008/0310565 A1* | 12/2008 | Abbott | H04L 25/0204 375/348 |
| 2013/0176991 A1* | 7/2013 | Yi | H04J 11/0076 370/336 |
| 2017/0104611 A1 | 4/2017 | Lee | |
| 2019/0045447 A1* | 2/2019 | Hussain | H04W 52/0241 |
| 2019/0045488 A1* | 2/2019 | Park | H04B 7/024 |

OTHER PUBLICATIONS

Hung, Kun-Chien, et al., "Pilot-Based LMMSE Channel Estimation for OFDM Systems With Power-Delay Profile Approximation," IEEE Transactions on Vehicular Technology, vol. 59, No. 1, Jan. 2010, 10 pages.

\* cited by examiner

METHOD AND APPARATUS FOR CHANNEL ESTIMATION IN WIRELESS COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0053074 filed on Apr. 25, 2017 in the Korean Intellectual Property Office, the disclosure of which is incorporated herein by reference in its entirety.

TECHNICAL FIELD

The present disclosure relates to a wireless communication system, and more particularly, to a method and an apparatus for channel estimation in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, a receiving apparatus should estimate a channel between the receiving apparatus and a transmitting apparatus to communicate with the transmitting apparatus. In a MIMO system, a transmitting apparatus and a receiving apparatus may include a plurality of transmission antennas and a plurality of reception antennas, respectively, and, since a signal transmitted from the transmitting apparatus to the receiving apparatus is reflected or scattered by buildings or other obstacles and is received by the receiving apparatus via multi-path, effects of the plurality of antennas and the multi-path should be considered for channel estimation. In addition, when the transmitting apparatus communicates with the receiving apparatus using a high-frequency band such as a millimeter wave, beamforming may be used to reduce attenuation of a signal. Therefore, the receiving apparatus should consider an effect of such beamforming for channel estimation.

The above information is presented as background information only to assist with an understanding of the present disclosure. No determination has been made, and no assertion is made, as to whether any of the above might be applicable as prior art with regard to the present disclosure.

SUMMARY

Accordingly, various embodiments of the present disclosure provide a method and an apparatus for channel estimation in a wireless communication system.

Various embodiments of the present disclosure provide a method and an apparatus for estimating an effective channel regarding a demodulation reference signal (DMRS) in a wireless communication system.

Various embodiments of the present disclosure provide a method and an apparatus for estimating an effective channel regarding a DMRS by using a cell-specific reference signal (CRS).

Various embodiments of the present disclosure provide a method and an apparatus for estimating an effective channel frequency response (CFR) and an effective channel impulse response (CIR) to a DMRS, based on significant channel tap values of the CIR to a CRS.

Various embodiments of the present disclosure provide a method and an apparatus for estimating an effective CFR based on channel tap values corresponding to significant channel tap indexes of a CIR in an effective CIR.

Various embodiments of the present disclosure provide a method and an apparatus for estimating an effective CFR based on a power delay profile (PDP) regarding channel tap values corresponding to significant channel tap indexes of a CIR in an effective CIR.

According to various embodiments of the present disclosure, an method of a receiving apparatus in a wireless communication system includes: estimating channel tap values by using a first reference signal; and estimating an effective channel regarding a second reference signal, based on channel tap indexes corresponding to values greater than or equal to a threshold from among the channel tap values.

According to various embodiments of the present disclosure, a receiving apparatus in a wireless communication system includes: at least one transceiver configured to receive a first reference signal and a second reference signal; and at least one processor configured to estimate channel tap values by using the first reference signal, and to estimate an effective channel regarding the second reference signal, based on channel tap indexes corresponding to values greater than or equal to a threshold from among the channel tap values.

According to various embodiments of the present disclosure, a receiving apparatus may more exactly estimate an effective channel by using a CRS in order to estimate an effective channel regarding a DMRS, and may achieve a low block error rate (BLER) even in a high signal power to noise power ratio (SNR).

The effects that can be achieved by the present disclosure are not limited to those mentioned above, and other effects that are not mentioned herein could be clearly understood by a person skilled in the art based on the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present disclosure are used to describe specific embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the present disclosure. In some cases, even if terms are terms which are defined in the specification, they should not be interpreted as excluding embodiments of the present disclosure.

In various embodiments of the present disclosure described below, hardware-wise approach methods will be described by way of an example. However, various embodiments of the present disclosure include technology using both hardware and software, and thus do not exclude software-based approach methods.

The present disclosure relates to an apparatus and a method for channel estimation in a wireless communication system. Specifically, the present disclosure describes operations for preventing performance degradation even in a high SNR environment by using parameters related to a CRS when an effective CFR is estimated by using a DMRS.

In the following description, terms indicating control information, terms indicating an operation state (for example, step, operation, procedure), terms indicating data (for example, information, bit, symbol), terms indicating network entities (for example, a receiving apparatus, a transmitting apparatus), terms indicating messages (for example, signal, data, signaling, symbol, stream), terms indicating elements of an apparatus are merely examples for convenience of explanation. Accordingly, the present disclosure is not limited to the terms described below and other terms having the same technical meanings may be used.

In addition, various embodiments of the present disclosure may be easily modified and applied to other communication systems. In addition, the present disclosure describes one-way operations for convenience of explanation, but an apparatus and a method according to various embodiments are applicable to bi-directional operations.

Figure 1:
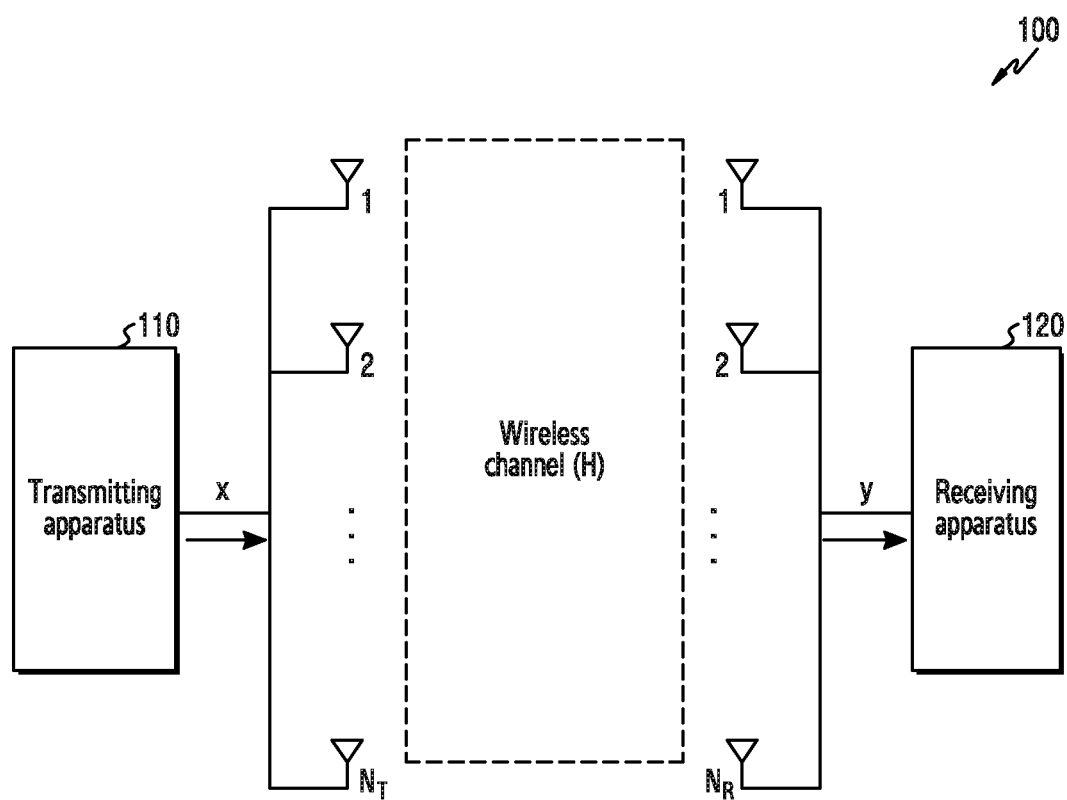
FIG. 1 is a view showing a wireless communication environment according to various embodiments of the present disclosure.

FIG. 1 is a view showing a wireless communication environment 100 according to various embodiments of the present disclosure. The wireless communication environment 100 may include a transmitting apparatus 110 and a receiving apparatus 120.

Referring to FIG. 1, the transmitting apparatus 110 may transmit a signal to the receiving apparatus 120. In other words, the receiving apparatus 120 may receive a signal from the transmitting apparatus 110. A signal transmitted by the transmitting apparatus 110 to the receiving apparatus 120 may include a reference signal, and the receiving apparatus 120 may receive the reference signal and estimate a channel between the transmitting apparatus 110 and the receiving apparatus 120. For example, the reference signal may include at least one of a CRS and a DMRS. The receiving apparatus 120 may estimate a channel by using any one of the CRS and the DMRS, or may estimate a channel by using both the CRS and the DMRS. The receiving apparatus 120 may feed information regarding the estimated channel back to the transmitting apparatus 110, and the transmitting apparatus 110 and the receiving apparatus 120 may exchange control information related to the information regarding the channel with each other.

The transmitting apparatus 110 and the receiving apparatus 120 may be distinguished from each other according to a transmission direction of a signal. Accordingly, when the transmission direction of the signal is changed, the transmitting apparatus 110 may function as the receiving apparatus 120, and to the contrary, the receiving apparatus 120 may function as the transmitting apparatus 110. For example, in downlink communication, the transmitting apparatus 110 may be a base station and the receiving apparatus 120 may be a terminal. In another example, in uplink communication, the transmitting apparatus 110 may be a terminal and the receiving apparatus 120 may be a base station. In addition, in device to device (D2D) communication, the transmitting apparatus 110 may be a terminal and the receiving apparatus 120 may be another terminal. Herein, the D2D communication may be referred to as sidelink communication. In addition, the transmitting apparatus 110 may be a base station and the receiving apparatus 120 may be another base station. In other examples, the transmitting apparatus 110 and the receiving apparatus 120 may be various other apparatuses.

Herein, the base station may be a network element (NE) that provides wireless access to a terminal. The base station may be referred to as an "access point (AP)," "an eNodeB (eNB)," a "5$^{th}$ generation (5G) node," a "5G NodeB (NB)," a "wireless point," or a "transmission/reception point (TRP)," or other terms having the same technical meanings as those of the aforementioned terms.

Herein, the terminal may be a device that is used by a user and may communicate with the base station via a wireless channel. The terminal may be referred to as a "user equipment (UE)," a "mobile station," a "subscriber station," a "remote terminal," a "wireless terminal," an "electronic device," or a "user device," or other terms having the same technical meanings as those of the aforementioned terms.

The transmitting apparatus 110 and the receiving apparatus 120 may include a plurality of antennas. For example, the transmitting apparatus 110 may include $N_t$ transmission antennas, and the receiving apparatus 120 may include $N_r$ reception antennas. When each of the transmitting apparatus 110 and the receiving apparatus 120 include the plurality of antennas, a channel between the transmitting apparatus 110 and the receiving apparatus 120 may be expressed in the form of a matrix, and, when the number of transmission antennas is $N_t$ and the number of reception antennas is $N_r$, the channel matrix H may have a spatial dimension of $[N_t \times N_r]$. According to various embodiments of the present disclosure, the system in which the transmitting apparatus 110 transmits a signal via the plurality of transmission antennas and the receiving apparatus 120 receives a signal via the plurality of reception antennas may be referred to as a multiple-input multiple-output (MIMO) system or simply "MIMO."

In FIGS. 2 to 11, the transmitting apparatus and the receiving apparatus are distinguished from each other, but this is merely for convenience of explanation and the functions of the apparatuses are not limited by their names.

Figure 2:
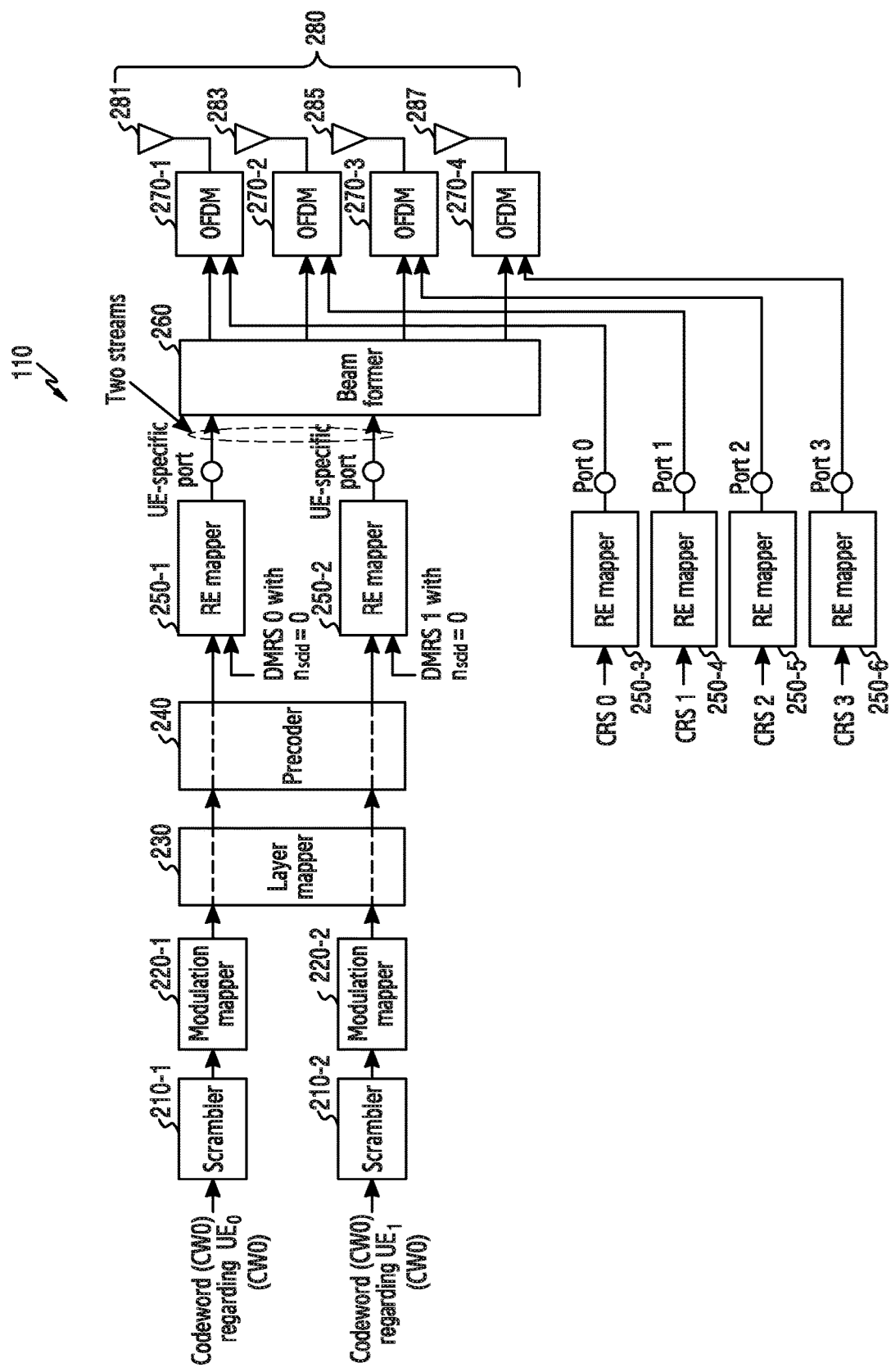
FIG. 2 is a view showing a functional configuration of a transmitting apparatus for transmitting a reference signal in a wireless communication system according to various embodiments of the present disclosure.

FIG. 2 is a view showing a functional configuration of a transmitting apparatus 110 for transmitting a reference signal according to various embodiments of the present disclosure. FIG. 2 illustrates only some of the elements necessary for the transmitting apparatus 110 to transmit a reference signal for convenience of explanation, and the transmitting apparatus 110 may further include other elements, in addition to the elements illustrated in FIG. 2.

Referring to FIG. 2, the transmitting apparatus 110 may include scramblers 210-1 and 210-2, modulation mappers 220-1 and 220-2, a layer mapper 230, a precoder 240, resource element (RE) mappers 250-1, 250-2, 250-3, 250-4, 250-5, and 250-6, a beamformer 260, orthogonal frequency division multiplexing (OFDM) converters 270-1, 270-2, 270-3, and 270-4, and a plurality of transmission antennas 280.

The scramblers 210-1 and 210-2 may scramble input bits. The modulation mappers 220-1 and 220-2 may modulate the inputted bits according to a modulation order and/or modulation scheme. The layer mapper 230 may divide an input signal into signal components corresponding to a plurality of layers, and the precoder 240 may perform precoding with respect to the output signal of the layer mapper 230. The RE mappers 250-1, 250-2, 250-3, 250-4, 250-5, and 250-6 may map the input signal onto at least one RE from among the plurality of REs classified by a time and a frequency. According to various embodiments of the present disclosure, a DMRS may be mapped onto an RE by the RE mappers 250-1 and/or 250-2, and a CRS may be mapped onto REs by the RE mappers 250-3, 250-4, 250-5, and 250-6.

CRS0, CRS1, CRS2, and CRS2 corresponding to an antenna port 0, an antenna port 1, an antenna port 2, and an antenna port 3 may be mapped onto the REs by the RE mappers 250-3, 250-4, 250-5, and 250-6. After CRSs corresponding to the antenna ports are mapped onto the Res, the CRSs may be converted into symbols through inverse fast Fourier transform (IFFT) and cyclic prefix (CP) additional procedures in the OFDM converters 270-1, 270-2, 270-3, and 270-4, and then the symbols may be transmitted via the plurality of transmission antennas 280. According to various embodiments of the present disclosure, the CRS0 may be transmitted via a transmission antenna 281, the CRS 1 may be transmitted via a transmission antenna 283, the CRS2 may be transmitted via a transmission antenna 285, and the CRS3 may be transmitted via a transmission antenna 287. The transmitted CRSs may be received via a plurality of antennas of a receiving apparatus 120, and the receiving apparatus 120 may estimate a channel based on the CRSs.

Figure 3A:
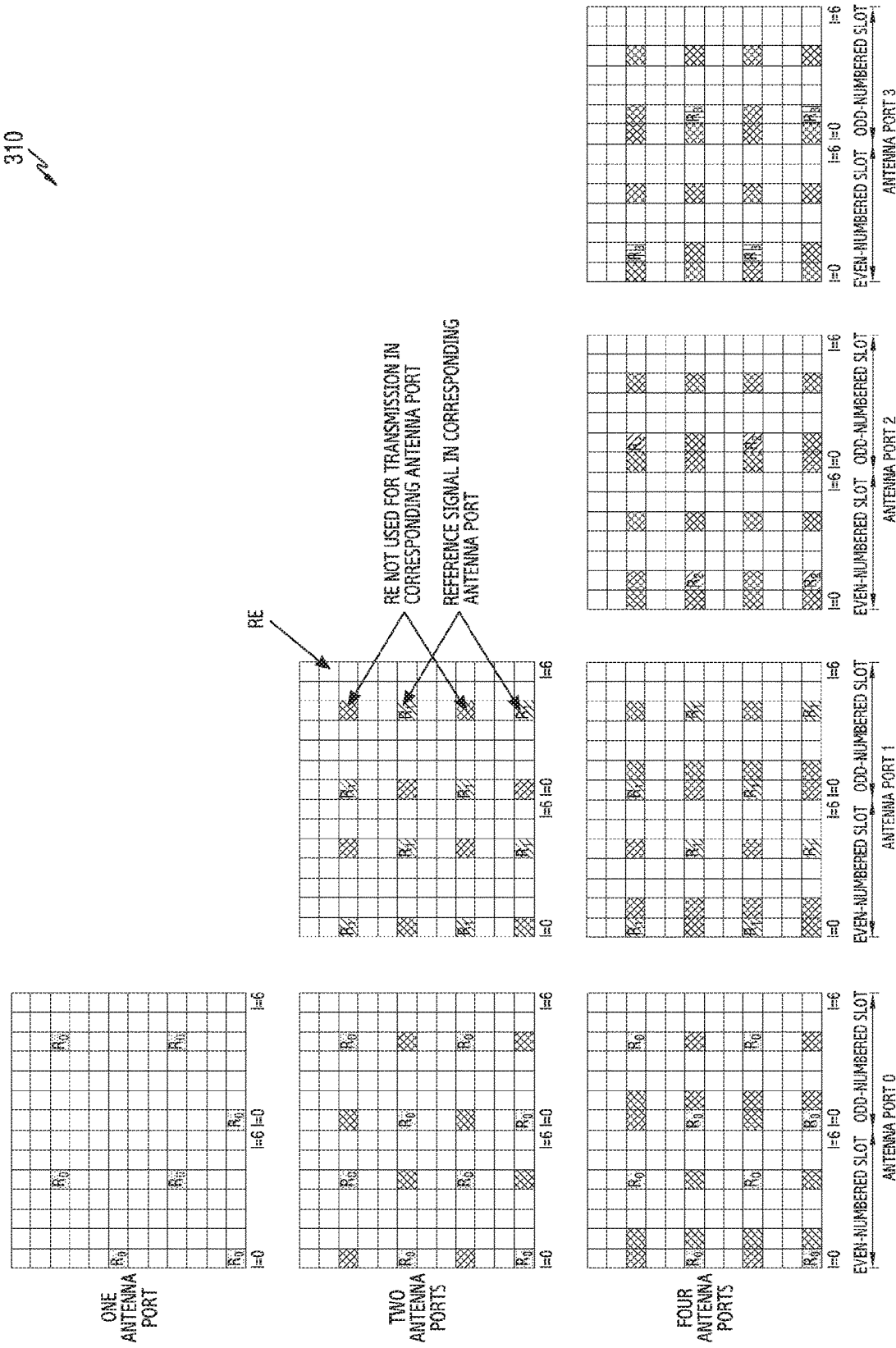
FIG. 3A is a view showing a resource element (RE) assigned a CRS in each antenna port in a wireless communication system according to various embodiments of the present disclosure.

A pattern in which the CRSs corresponding to the antenna ports are mapped onto the REs will be described in detail below with reference to FIG. 3A. In FIG. 3A, the REs onto which the CRSs are mapped are shaded with the display of $R_0$. In FIG. 3A, a relatively small square indicates one RE, and a relatively large square which is formed of 168 (14×12) small squares indicates one physical resource block (PRB). In each PRB, the horizontal direction indicates a time region and the vertical direction indicates a frequency region. Accordingly, one PRB may include 14 symbols in the time region and 12 subcarriers in the frequency region. Referring to FIG. 3A, when there is one antenna port, in one PRB, data may be mapped onto REs other than REs onto which the CRS corresponding to the antenna port is mapped. However, when there are two or more antenna ports, in one PRB, data may be mapped onto other REs except for not only the REs onto which the CRS corresponding to an antenna port is mapped, but also the REs onto which the CRS corresponding to another antenna port are mapped. In FIG. 3A, in the PRB in which CRSs corresponding to the antenna port 0, the antenna port 1, the antenna port 2, and the antenna port 3 are mapped onto REs, REs onto which CRSs corresponding to the other antenna ports are mapped are expressed by a diagonal grid pattern (x). In other words, the square expressed by the diagonal grid pattern (x) indicates an RE onto which data cannot be mapped.

For effective MIMO transmission, the transmitting apparatus 110 may require a large number of transmission antennas, and, as the large number of transmission antennas are used, the number of CRSs corresponding to the antenna ports may also increase. When the number of CRSs increases, REs which may be used to transmit data may be relatively reduced in the PRB, and thus spectrum efficiency of the receiving apparatus 120 receiving a MIMO signal may be degraded. In addition, when the receiving apparatus 120 estimates a channel by using the CRS, a precoder that is determined by the receiving apparatus 120 in a codebook during a channel estimation process may not be identical to the precoder to be used for the transmitting apparatus 110 to transmit. Accordingly, the precoder may not be used, and a reference signal for a specific UE (for example, the receiving apparatus 120) and an antenna port corresponding to the reference signal are employed. Accordingly, a procedure for transmitting the DMRS, which is another reference signal, as well as the CRS will be described in FIG. 2. Referring to FIG. 2, a codeword (CW)0 regarding UE0 may be mapped onto an RE with the DMRS corresponding to a UE-specific antenna port 7 via the scramblers 210-1 and 210-2 and the modulation mappers 220-1 and 220-2. A CW0 regarding $UE_1$ may be mapped onto an RE with the DMRS corresponding to a UE-specific antenna port 8 through a similar process. Herein, when the CW is multiplexed with the DMRS and transmitted, layer mapping and precoding are not performed with respect to the CW. Regarding this, processing of each CW bypasses the layer mapper and the precoder as indicated by dashed-lines. FIG. 2 illustrates that the same CW is transmitted with respect to $UE_0$ and $UE_1$ (for example, CW0 for $UE_0$ and CW0 for $UE_1$). However, this is merely an example, and different CWs for $UE_0$ and $UE_1$ (for example, CW0 for $UE_0$ and CW1 for $UE_1$) may be transmitted. Beamforming may be performed with respect to the DMRSs before the DMRSs are transmitted via the plurality of transmission antennas 280 of the transmitting apparatus 110. Beamforming may be performed by the beamformer 260. The DMRSs may be multiplexed with data, and the same beamforming may be applied to the multiplexed DMRSs and data. For example, DMRS0 may be multiplexed with the codeword for $UE_0$, and the same beamforming may be applied to the multiplexed DMRS0 and codeword for $UE_0$. In another example, DMRS1 may be multiplexed with the codeword for $UE_1$, and the same beamforming may be applied to the multiplexed DMRS1 and codeword for $UE_1$. In other words, beamforming applied to the DMRS may be the same as beamforming applied to data multiplexed with the DMRS. The beamforming operation by the beamformer 260 may be referred to as a "digital precoder." The same beamforming may be performed with respect to the DMRS and the data multiplexed with the DMRS at the digital precoder (for example, the beamformer 260) and the antenna end.

Although not shown, beamforming may be performed with respect to each CRS according to various embodiments of the present disclosure. For example, when beamforming is performed with respect to CRS0, the antenna port 0 corresponding to CRS0 may be a beam-formed antenna. In another example, when beamforming is performed with respect to CRS3, the antenna port 3 corresponding to CRS3 may be a beam-formed antenna.

After beamforming is performed with respect to DMRS0 by the beamformer 260 of the transmitting apparatus 110, DMRS0 may pass through the OFDM converters 270-1, 270-2, 270-3, and 270-4 and may be transmitted via the transmission antennas 281, 283, 285, and 287. DMRS1 may also be transmitted via the transmission antennas 281, 283, 285, and 287 after beamforming is performed with respect to DMRS1 by the beamformer 260. In other words, the CRSs corresponding to different antenna ports may be transmitted via different transmission antennas, but the DMRSs corresponding to different antenna ports may be transmitted via all transmission antennas. Beamforming may be performed by the beamformer 260 on a basis of at least one PRB. In other words, the same beamforming method may be applied to at least one PRB.

Figure 3B:
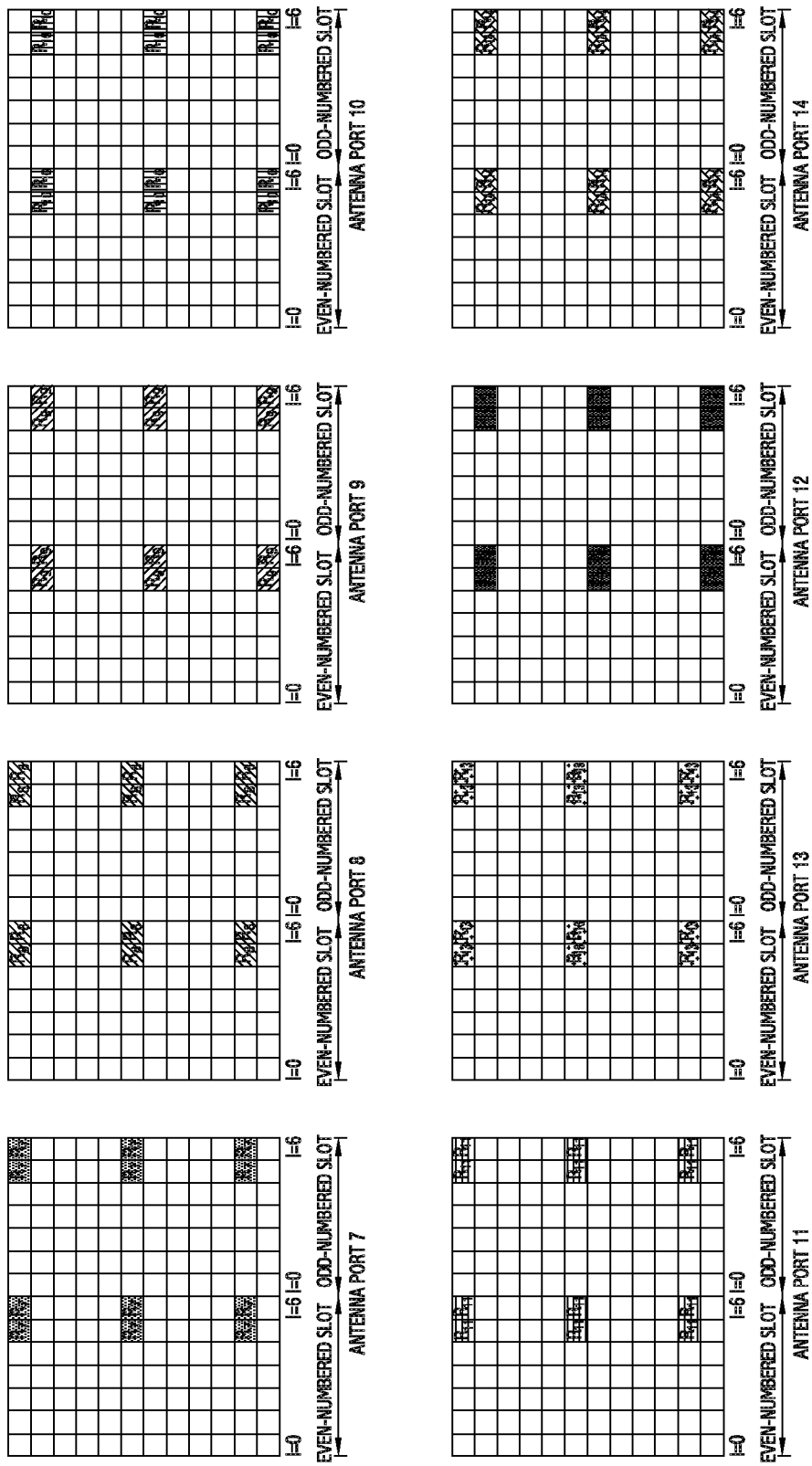
FIG. 3B is a view showing an RE assigned a DMRS in each antenna port in a wireless communication system according to various embodiments of the present disclosure.

A pattern in which DMRSs corresponding to antenna ports are mapped onto REs will be described in detail with reference to FIG. 3B. In FIG. 3B, an RE onto which a DMRS is mapped is shaded with the display of $R_0$. FIG. 3 illustrates REs onto which DMRSs corresponding to antenna ports are mapped in the PRB when there are eight (8) DMRS antenna ports (antenna ports 7, 8, 9, 10, 11, 13, 12, 14). Referring to FIG. 3B, DMRSs corresponding to the antenna ports 7, 8 11, and 13 may be mapped onto the same REs in the PRB. Different orthogonal codes (Walsh codes) may be applied to the DMRSs corresponding to the antenna ports 7, 8, 11 and 13, such that the receiving apparatus 120 receiving the DMRSs can identify the antenna ports. In other words, code division multiplexing (CDM) may be applied to the DMRSs corresponding to the antenna ports 7, 8, 11, and 13. DMRSs corresponding to the antenna ports 9, 10, 12, and 14 may also be mapped onto the same REs in the PRB. CDM may be applied to the DMRSs corresponding to the antenna ports 9, 10, 12, and 14, such that the antenna ports can be identified. Since the REs onto which the DMRSs corresponding to the antenna ports 7, 8, 11, and 13 are mapped, and the REs onto which the DMRSs corresponding to the antenna ports 9, 10, 12, and 14 are mapped are different from each other, the receiving apparatus 120 receiving the DMRSs may distinguish between a group of antenna ports (antenna ports 7, 8, 11, and 13) and the other group of antenna ports (antenna ports 9, 10, 12, and 14) based on mapping locations (time, frequency) of the DMRSs in the PRB. In other words, frequency division multiplexing (FDM) may be applied to a group of antenna ports (antenna ports 7, 8, 11, and 13) and the other group of antenna ports (antenna ports 9, 10, 12, and 14). The receiving apparatus 120 may obtain an appropriate DMRS by performing decoding (for example, Walsh decoding) with respect to the DMRS received at an RE of an antenna port corresponding to the receiving apparatus 120 with a code corresponding to the receiving apparatus 120.

As described above, since different beamforming methods are applied to data multiplexed with the CRSs and the DMRSs (beamforming applied to the DMRS is the same as beamforming applied to data multiplexed with the DMRS, and beamforming applied to the CRS is different from beamforming applied to data multiplexed with the CRS), a channel estimated by the DMRS may be different from a channel estimated by the CRS. In the following description, the channel estimated by the CRS may be referred to as a "real channel" or simply "channel," and the channel estimated by the DMRS may be referred to as an "effective channel." In addition, "channel estimation" or "estimating channel" may refer to estimating at least one of a channel impulse response (CIR), which is an impulse response to a channel, and a channel frequency response (CFR), which is a frequency response to a channel, and "effective channel estimation" or "estimating an effective channel" may refer to at least one of estimating an effective CIR which is an impulse response to an effective channel, and estimating an effective CFR which is a frequency response to an effective channel. Herein, the CFR and the effective CFR may be results of performing a fast Fourier transform (FFT) operation with respect to the CIR and the effective CIR.

The receiving apparatus 120 may receive the DMRS transmitted from the transmitting apparatus 110, and may estimate an effective channel. A configuration of the receiving apparatus 120 for estimating an effective channel will be described in detail below with reference to FIG. 4.

Figure 4:
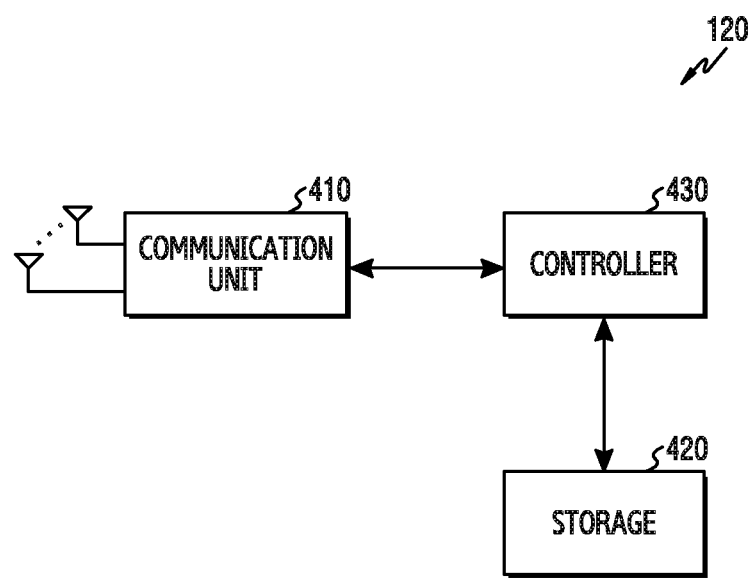
FIG. 4 is a view showing a functional configuration of a receiving apparatus in a wireless communication system according to various embodiments of the present disclosure.

FIG. 4 is a view showing a functional configuration of a receiving apparatus 120 in a wireless communication system according to various embodiments of the present disclosure. The configuration illustrated in FIG. 4 may be understood as a configuration of the receiving apparatus 120 of FIG. 1. The term "unit" or terms ending with suffixes "-er," and "-or" refer to a unit processing at least one function or operation and may be implemented by hardware, software, or a combination of hardware and software. In addition, as described above, the functions of the apparatuses are not limited by names, and in the following description, the receiving apparatus 120 may include not only a configuration for receiving a signal from the transmitting apparatus 110 of FIG. 1, but also a configuration for transmitting a signal to the transmitting apparatus 110.

Referring to FIG. 4, the receiving apparatus 120 may include a communication unit 410, a storage 420, and a controller 430.

The communication unit 410 may perform functions for transmitting and receiving signals via a wireless channel. For example, the communication unit 410 may perform a function of converting between a baseband signal and a bit sequence according to a physical layer standard of the system. For example, when transmitting control information, the communication unit 410 may generate modulation symbols by encoding and modulating a transmission bit sequence. In addition, when receiving data, the communication unit 410 may restore a reception bit sequence by demodulating and decoding a baseband signal. In addition, the communication unit 410 may up-convert a baseband signal into a radio frequency (RF) band signal, and then may transmit the signal via an antenna, and may down-convert an RF band signal received via the antenna into a baseband signal. For example, the communication unit 410 may include a decoder, a demodulator, an analog to digital converter (ADC), a reception filter, an amplifier, a mixer, and an oscillator. In addition, the communication unit 410 may include an encoder, a modulator, a digital to analog converter (DAC), and a transmission filter in case that the communication unit 410 transmits a signal.

The communication unit 410 may include a plurality of antennas. The communication unit 410 may receive a plurality of streams via the plurality of antennas. In addition, the communication unit 410 may include a plurality of RF chains. Furthermore, the communication unit 410 may perform beamforming. For beamforming, the communication unit 410 may adjust a phase and a size of each of the signals transmitted and received via the plurality of antennas or antenna elements, that is, may perform analog beamforming. Alternatively, the communication unit 410 may perform beamforming, that is, digital beamforming, with respect to a digital signal.

In addition, the communication unit 410 may include different communication modules to process signals of different frequency bands. Furthermore, the communication unit 410 may include a plurality of communication modules to support a plurality of different wireless access technologies. For example, the different wireless access technologies may include Bluetooth low energy (BLE), wireless fidelity (WiFi), WiFi gigabyte (WiGig), a cellular network (for example, long term evolution (LTE), LTE-Advanced (LTE-A), a $5^{th}$ Generation (5G) network), etc. In addition, the different frequency bands may include a super high frequency (SHF) (for example, 2.5 GHz, 5 GHz) band, a millimeter wave (for example, 30 GHz, 60 GHz) band.

The communication unit 410 may transmit and receive signals as described above. Accordingly, an entirety or a portion of the communication unit 410 may be referred to as a transmitter, a receiver, or a transceiver. In addition, in the following description, transmitting and receiving performed via a wireless channel may including performing, by the communication unit 410, the above-described processing. According to an embodiment, the communication unit 410 may receive a first reference signal and a second reference signal.

The storage 420 may store data such as a basic program for the operation of the receiving apparatus 120, an application program, setting information, etc. The storage 420 may be configured by a volatile memory, a nonvolatile memory, or a combination of a volatile memory and a nonvolatile memory. In addition, the storage 420 may provide stored data according to a request of the controller 430.

The controller 430 may control overall operations of the receiving apparatus 120. For example, the controller 430 may transmit and receive signals via the communication unit 410. In addition, the controller 430 may write and read data on and from the storage 420. In addition, the controller 430 may perform functions of a protocol stack required by communication standards. To achieve this, the controller 430 may include at least one processor or microprocessor or may be configured as a portion of the processor. In addition, a portion of the communication unit 410 and the controller 430 may be referred to as a communication processor (CP). According to an embodiment, the controller 430 may estimate channel tap values by using the first reference signal, and may estimate an effective channel regarding the second reference signal based on channel tap indexes corresponding to values greater than or equal to a threshold from among the channel tap values. For example, the controller 430 may estimate a channel and/or effective channel based on a reference signal received from the transmitting apparatus 110 according to various embodiments, which will be described below, and various channel estimation algorithms.

FIG. 4 illustrates a configuration of the receiving apparatus 120. Herein, when the configuration of FIG. 4 is a configuration of a base station, the receiving apparatus 120 may further include a backhaul communication unit to provide an interface for communicating with a backhaul network.

A signal transmitted from the transmitting apparatus 110 to the receiving apparatus 120 may be reflected or scattered by a building or other obstacles, and the receiving apparatus 120 may receive the signal from the transmitting apparatus 110 via multi-path. Accordingly, a CIR or an effective CIR estimated by the receiving apparatus 120 may include a number of channel tap values corresponding to a maximum delay length (for example, a maximum delay spread) of the multi-path. A channel tap index may be defined to indicate each channel tap value, and the number of channel tap indexes in the CIR or the effective CIR may correspond to the maximum delay length of the multi-path. Herein, the channel tap index may be assigned to a channel tap value according to a degree of multi-path delay. For example, a low channel tap index may indicate a channel tap value corresponding to a low multi-path delay, and a high channel tap index may indicate a channel tap value corresponding to a high multi-path delay.

It may be assumed that powers of channel tap values regarding all channel tap indexes in the effective CIR are uniform or exponentially decay as the channel tap index increases. In other words, it may be assumed that a power delay profile (PDP) of the effective CIR is uniform or exponentially decays. The channel tap value in the present disclosure may indicate a power value of a channel tap. When it is assumed that the PDP of the effective CIR is uniform or exponentially decays, the receiving apparatus 120 may estimate an effective CFR by using a received DMRS and an autocorrelation function (ACF). A detailed process of the receiving apparatus 120 estimating the effective CFR by using the received DMRS and the ACF will be described in detail below.

However, even when the receiving apparatus 120 receives a signal via the multi-path, most of the signal components may be received via a portion of the multi-path, and no signal may be received via the other paths. In other words, the effective CIR may be a sparse effective CIR in which a channel tap value exists for a specific channel tap index, and does not exist for the other channel tap indexes (that is, 0). Alternatively, in the effective CIR, a channel tap value may be greater than or equal to the threshold with respect to a specific channel tap index, and may be less than the threshold with respect to the other channel tap indexes. Herein, the threshold may be set to a low value enough to identify that the channel tap value in the specific channel tap index is almost 0. Accordingly, when the receiving apparatus 120 estimates the effective CFR on the assumption that the PDP regarding the channel tap values corresponding to all channel tap indexes of the effective CIR is uniform or exponentially decays, an inexact effective CFR may be estimated.

According to various embodiments of the present disclosure, the receiving apparatus 120 may use not only the DMRS but also a CRS to estimate the effective CFR. The receiving apparatus 120 may estimate the CIR based on the CRS, and may determine a channel tap value greater than or equal to the threshold in the CIR and a channel tap index corresponding to the channel tap value greater than or equal to the threshold. According to various embodiments of the present disclosure, it may be assumed that the channel tap index corresponding to the channel tap value (for example, a non-zero channel tap value) greater than or equal to the threshold in the CIR is the same as the channel tap index corresponding to the channel tap value greater than or equal to the threshold in the effective CIR. As shown in FIG. 2, since the DMRS and the CRS are transmitted via the same transmission antenna, the DMRS and the CRS may be deemed to be received by the receiving apparatus 120 via the same multi-path. Accordingly, this assumption may be fairly reasonable. In the following description, a channel tap value greater than or equal to the threshold or a non-zero channel tap value in the CIR or effective CIR is defined as a "significant channel tap value," and a channel tap index corresponding to the significant channel tap value is defined as a "significant channel tap index." The receiving apparatus 120 may determine a significant channel tap index in the CIR, and may estimate an effective CFR by considering a PDP regarding channel tap values corresponding to the same significant channel tap indexes as those of the CIR, rather than considering all channel tap indexes in the effective CIR. The PDP regarding the channel tap values corresponding to the channel tap indexes determined based on the CRS may be uniform or may exponentially decay. According to the above-described method, when the receiving apparatus 120 performs channel estimation by using the DMRS, only the real paths through which the signal is received from the multi-path are considered and thus a more exact CFR may be estimated.

In the following description, a detailed method for estimating an effective channel by using a CRS and a DMRS in the receiving apparatus 120 according to various embodiments of the present disclosure will be described in detail.

Figure 5:
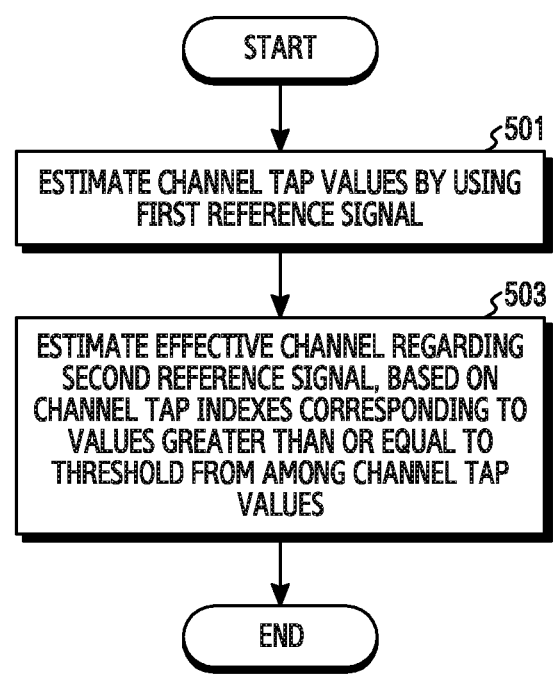
FIG. 5 illustrates an operation flowchart for estimating an effective channel in a receiving apparatus in a wireless communication system according to various embodiments of the present disclosure.

FIG. 5 illustrates an operation flowchart for estimating an effective channel in a receiving apparatus according to various embodiments of the present disclosure.

Referring to FIG. 5, in step 501, the receiving apparatus 120 may estimate channel tap values by using a first reference signal. For example, the first reference signal may include a CRS. When the first reference signal is the CRS, beamforming applied to the first reference signal may be different from beamforming applied to data multiplexed with the first reference signal. Although not shown, the receiving apparatus 120 may estimate a CIR based on the first reference signal (for example, the CRS). The channel tap values estimated in step 501 may be channel tap values of the CIR.

In step 503, the receiving apparatus 120 may estimate an effective channel regarding a second reference signal, based on channel tap indexes corresponding to values greater than or equal to a threshold from among the channel tap values. For example, the second reference signal may include a DMRS. When the second reference signal is the DMRS, beamforming applied to the second reference signal may be the same as beamforming applied to data multiplexed with the second reference signal. Although not shown, the receiving apparatus 120 may determine significant channel tap values from among the channel tap values estimated in step 501. In addition, the receiving apparatus 120 may determine significant channel tap indexes corresponding to the significant channel tap values. The receiving apparatus 120 may estimate the effective channel regarding the second reference signal (for example, the DMRS), based on channel tap values of the effective CIR corresponding to the determined channel tap indexes. For example, the receiving apparatus 120 may estimate an effective CFR regarding the second reference signal.

As described in the embodiment of FIG. 5, the effective channel regarding the second reference signal may be estimated based on channel information estimated by using the first reference signal. Accordingly, based on advantages obtained from different reference signals, the effective channel can be more exactly estimated. A process of estimating the effective CFR based on the CRS will be described in detail with reference to FIG. 6.

Figure 6:
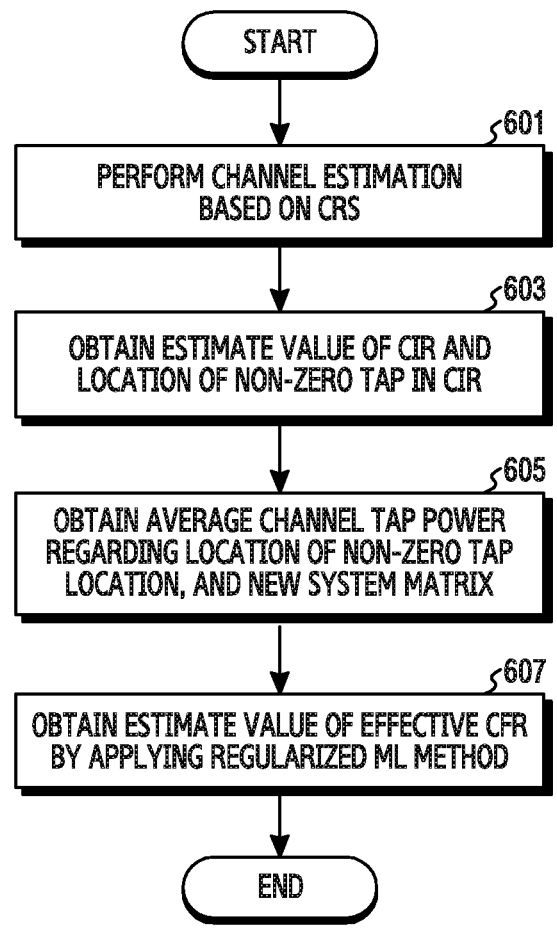
FIG. 6 illustrates an operation flowchart of a receiving apparatus for estimating an effective CFR based on a CRS in a wireless communication system according to various embodiments of the present disclosure.

FIG. 6 illustrates an operation flowchart of the receiving apparatus for estimating a CFR based on a CRS according to various embodiments of the present disclosure.

Referring to FIG. 6, in step 601, the receiving apparatus 120 performs channel estimation based on a CRS. For channel estimation, the receiving apparatus 120 receives a CRS from the transmitting apparatus 110.

In step 603, the receiving apparatus 120 determines an estimation value of a CIR and a location of a non-zero tap in the CIR. The receiving apparatus 120 may determine the CIR and channel tap values of the CIR as a result of performing channel estimation based on the CRS. In addition, the receiving apparatus 120 may determine tap locations of significant channel tap values from among channel tap values of the CIR. Herein, the tap location may be indicated by a channel tap index. In other words, the receiving apparatus 120 may determine a significant channel tap index in the CIR.

In step 605, the receiving apparatus 120 may determine an average channel tap power regarding the locations of the non-zero taps and a new system matrix. The system matrix is a matrix indicating a relationship between a received reference signal and a CIR (or an effective CIR) estimated from the received reference signal, and may be a submatrix which is formed of components related to a subcarrier index of the reference signal and a maximum delay length of multi-path in an FFT matrix in which a component at a row k and a column l is $e^{-j2\pi kl/N}$. According to various embodiments of the present disclosure, the receiving apparatus 120 may obtain an average power regarding significant channel tap values in the CIR, rather than obtaining an average power regarding all channel tap values of the CIR. In addition, the receiving apparatus 120 may obtain a new system matrix based on the significant channel tap indexes of the CIR. The receiving apparatus 120 may extract column vectors corresponding to the significant channel tap indexes of the CIR from an original system matrix, and may determine a new system matrix which is formed of the extracted column vectors. When the new system matrix is used, only channel tap values corresponding to the significant channel tap indexes of the CIR in the effective CIR may be considered in estimating an effective CFR.

In step 607, the receiving apparatus 120 may determine an estimation value of the effective CFR by applying a regularized maximum likelihood (ML) method. The receiving apparatus 120 may estimate the effective CFR based on at least one of the average channel tap power and the new system matrix obtained in step 605. When a PDP of the channel tap values corresponding to the significant channel tap indexes of the CIR in the effective CIR is uniform, the regularized ML method may be the same as an estimation method by a least minimum mean square error (LMMSE) (hereinafter, referred to as an "LMMSE method"). In other words, the receiving apparatus 120 may estimate the effective CFR by using at least one of the average channel tap power and the new system matrix, which are obtained in step 605, according to the LMMSE method. Alternatively, the PDP of the channel tap values corresponding to the significant channel tap indexes of the CIR in the effective CIR may exponentially decay. In this case, the receiving apparatus 120 may estimate the effective CFR by using at least one of the average channel tap power and the new system matrix which are obtained in step 605 according to the LMMSE method.

Hereinafter, an operation of determining significant channel tap values and significant channel tap indexes in a CIR in the receiving apparatus 120 will be described with reference to FIG. 7.

Figure 7:
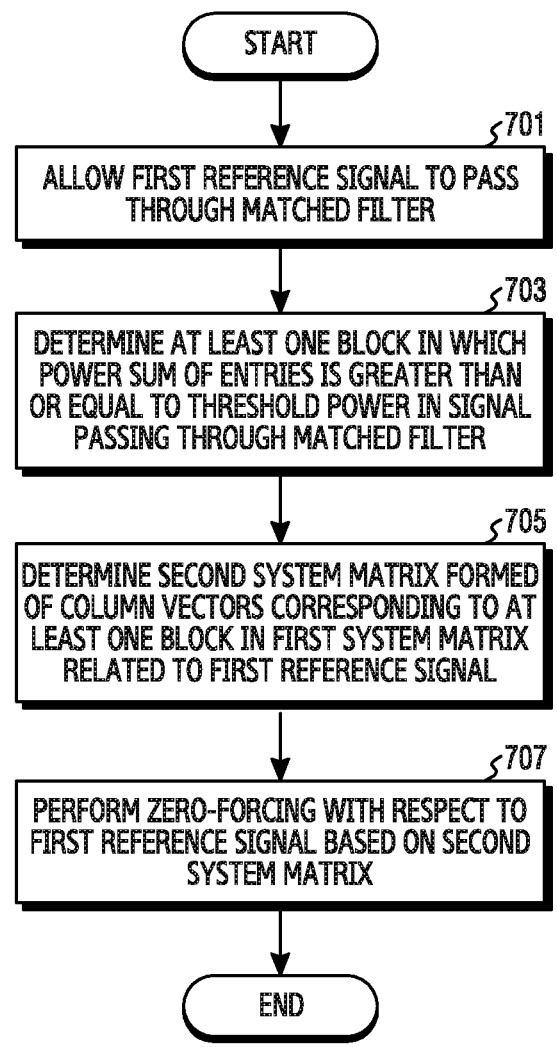
FIG. 7 illustrates an operation flowchart of a receiving apparatus for determining a channel tap value greater than or equal to a threshold in a CIR in a wireless communication system according to various embodiments of the present disclosure.

FIG. 7 illustrates an operation flowchart of the receiving apparatus determining a channel tap value greater than or equal to a threshold in a CIR according to various embodiments of the present disclosure.

Referring to FIG. 7, in step 701, the receiving apparatus 120 allows a first reference signal to pass through a matched filter. That is, the receiving apparatus 120 filters the first reference signal based on the matched filter. For example, the first reference signal may be a CRS. The matched filter may output a value or vector indicating how an input signal to the matched filter matches a system matrix regarding the CRS. Herein, the system matrix regarding the CRS may be a matrix indicating a relationship between a CRS and a CIR.

In step 703, the receiving apparatus 120 may determine at least one block comprising entries whose power sum is greater than or equal to a threshold power in the signal passing through the matched filter. The signal passing through the matched filter may include a plurality of blocks, and each of the plurality of blocks may include a plurality of entries. When the signal passing through the matched filter is expressed in the form of a vector, each block may refer to a set of components values included in the vector, and each entry may refer to each component value. According to various embodiments of the present disclosure, the number of blocks included in the signal passing through the matched filter may correspond to a maximum delay length of multi-path. In other words, the number of blocks included in the signal passing through the matched filter may be the same as the number of channel tap values included in a CIR or an effective CIR. The indexes of the blocks may be the same as channel tap indexes of the CIR or effective CIR. Although not shown, the receiving apparatus 120 may determine a power sum of entries included in each block with respect to the blocks of the signal passing through the matched filter. The receiving apparatus 120 may determine at least one block comprises the entries whose power sum is greater than or equal to the threshold power from the signal passing through the matched filter, based on the power sum of the entries determined for each block. For example, the threshold power may vary according to the number of transmission antennas of the transmitting apparatus 110. The index of the at least one block determined in step 703 may be the same as the significant channel tap indexes of the CIR or may be a portion of the significant channel tap indexes.

In step 705, the receiving apparatus 120 may determine a second system matrix which is formed of column vectors corresponding the at least one block in a first system matrix related to the first reference signal. For example, the first reference signal may be a CRS and the first system matrix may be a system matrix regarding the CRS. The column vector corresponding to the at least one block may be a vector indicating a column corresponding to an index of the at least one block in the first system matrix. In other words, the second system matrix may be a matrix that is formed of a portion of the columns of the first system matrix.

In step 707, the receiving apparatus 120 may perform zero-forcing with respect to the first reference signal based on the second system matrix. As a result of the zero-forcing, an estimate of CIR expressed in the form of a matrix may be obtained. A channel tap value of the estimate of CIR may be greater than or equal to a threshold in the channel tap index corresponding to the index of the at least one block determined in step 703, and may be less than the threshold in the other channel tap indexes. In other words, the index of the at least one block determined in step 703 may be a significant channel tap index of the estimate of CIR. The above-described operations in steps 701 to 707 may be defined as a "first iteration."

The index of the at least one block determined in step 703 may be a portion of the significant channel tap indexes of the CIR, and the estimate of CIR may include only a portion of the significant channel tap values of the CIR. To estimate a complete CIR including all significant channel tap values, steps 701 to 707 may be repeated. In this case, an input signal to the matched filter in step 701 may be a signal excluding an interference by the estimate of CIR determined in the previous iteration from the first reference signal. According to various embodiments of the present disclosure, the signal excluding the interference by the estimate of CIR determined in the previous iteration from the first reference signal may be referred to as a "residual vector." In addition, a union set of at least one block determined in a specific iteration in step 703 and at least one block determined in the previous iteration may be used for the operation in step 705.

For example, the iteration may be repeated a predetermined number of times. In another example, the iteration may be repeated until i) a power of a residual vector in a specific iteration is smaller than a reference value or ii) a component value having the greatest norm value from among component values of the signal passing through the matched filter in a specific iteration is smaller than the reference value. The estimate of CIR after the repetition of the iteration is stopped may be a complete CIR including all significant channel tap values.

The method described with reference to FIG. 7 may be referred to as a block stagewise orthogonal matching pursuit (StOMP) algorithm. Hereinafter, a specific algorithm of block StOMP for estimating a CIR by using a CRS and determining significant channel tap indexes of the CIR will be described with reference to FIG. 8.

Figure 8:
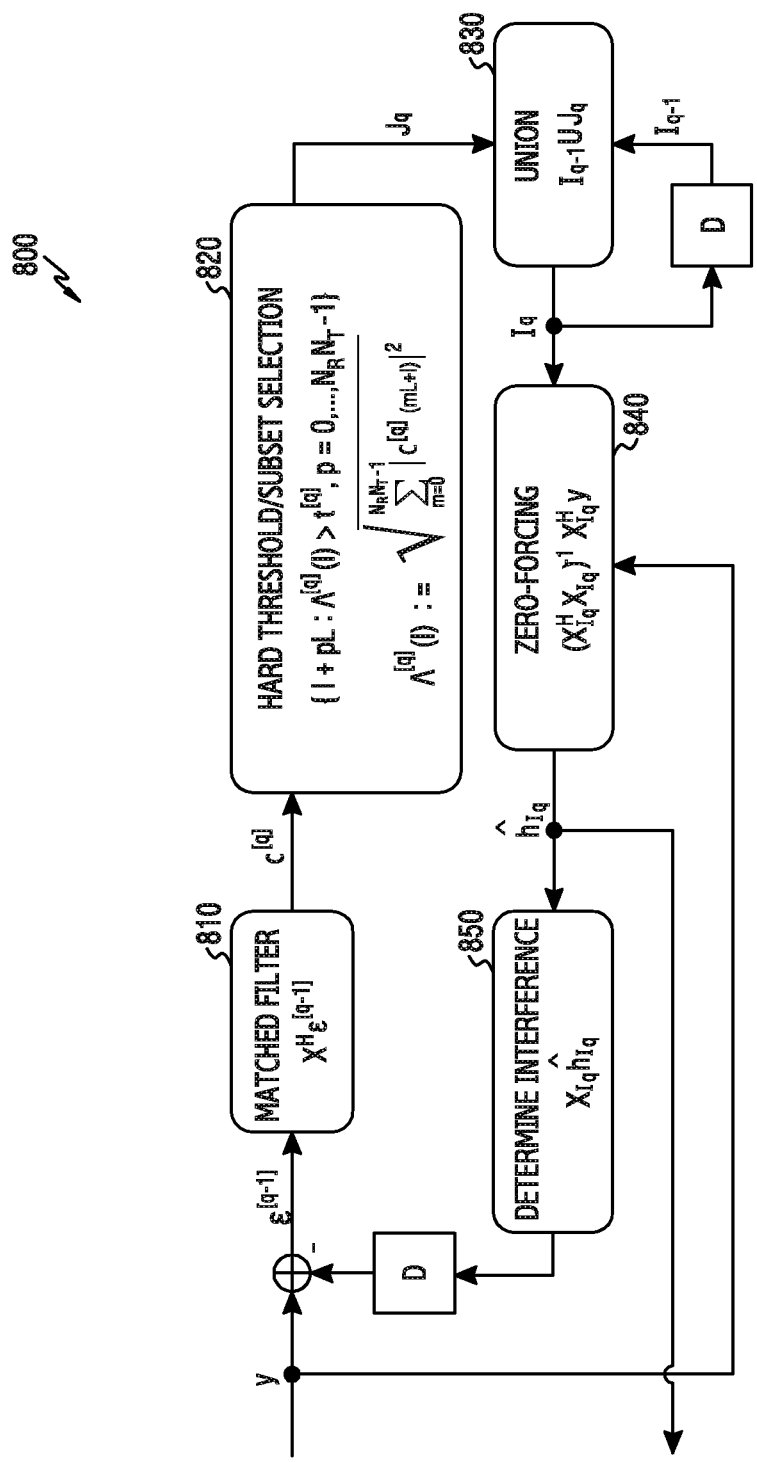
FIG. 8 is a view showing a block stage-wise orthogonal matching pursuit (StOMP) algorithm in a wireless communication system according to various embodiments of the present disclosure.

FIG. 8 illustrates a block StOMP algorithm 800 according to various embodiments of the present disclosure.

A relationship between a CRS vector y received by the receiving apparatus 120 and a CIR h may be established as shown in Equation 1 presented below:

$$y = Xh + z \qquad \text{Equation 1}$$

where y is a CRS vector received by the receiving apparatus 120, h is a CIR, X is a system matrix regarding the CRS, and z is a noise signal. The receiving apparatus 120 may determine an estimate value $\hat{h}$ of the CIR h based on the CRS vector y, and a significant channel tap index of the estimate of CIR $\hat{h}$ through the block StOMP algorithm 800.

Referring to FIG. 8, a residual vector $\varepsilon^{[q-1]}$ of a q-th iteration is inputted to a matched filter 810. In the first iteration (q=1), the residual vector $\varepsilon^{[q-1]}$ may be the received CRS vector y. An output $c^{[q]}$ of the matched filter 810 regarding the residual vector $\varepsilon^{[q-1]}$ in the q-th iteration of the vector may be expressed as shown in Equation 2 presented below:

$$c^{[q]} = X^H \varepsilon^{[q-1]} \qquad \text{Equation 2}$$

wherein $\varepsilon^{[q-1]}$ is a residual vector of a q-th iteration, X is a system matrix regarding a CRS, and $c^{[q]}$ is an output of the matched filter 810 regarding the residual vector $\varepsilon^{[q-1]}$ in the q-th iteration. An i-th entry of the output $c^{[q]}$ of the matched filter 810 may indicate how the residual vector $\varepsilon^{[q-1]}$ and an i-th column vector of the system matrix X match each other. The number of entries of $c^{[q]}$ may be expressed by $LN_r N_t$. Herein, L is a maximum delay length of multi-path, $N_r$ is the number of reception antennas of the receiving apparatus 120, and $N_t$ is the number of transmission antennas of the transmitting apparatus 110. When $N_r N_t$ entries in $c^{[q]}$ is defined as one block, $c^{[q]}$ may include L blocks. The receiving apparatus 120 may determine a power sum of entries included in the block with respect to each block index l (l=0, . . . , L−1) in $c^{[q]}$. The power sum $\Lambda^{[q]}(l)$ of the entries included in the block of the index l may be defined as shown Equation 3 presented below:

$$\Lambda^{[q]}(l) = \sqrt{\sum_{m=0}^{N_R N_T - 1} |c^{[q]}(mL + l)|^2} \qquad \text{Equation 3}$$

where $c^{[q]}$ is an output of the matched filter 810 in the q-th iteration, l is a block index, L is a maximum delay length of multi-path, $\Lambda^{[q]}(l)$ is a power sum of entries included in the block of the index l, $N_R$ is the number of reception antennas of the receiving apparatus 120, and $N_T$ is the number of transmission antennas of the transmitting apparatus 110.

The receiving apparatus 120 may determine the power sum of entries included in each block in $c^{[q]}$ according to Equation 3, and then may determine blocks comprising entries whose power sum is greater than a threshold $t^{[q]}$. A set of indexes of entries included in the block comprises entries whose power sum is greater than the threshold $t^{[q]}$ may be expressed by $\{l + pL : \Lambda^{[q]}(l) > t^{[q]}, p=0, \ldots, N_R N_T - 1\}$. Herein, l is a block index, L is a maximum delay length of multi-path, $\Lambda^{[q]}(l)$ is a power sum of entries included in the block of the index l, $t^{[q]}$ is a threshold, $N_R$ is the number of reception antennas of the receiving apparatus 120, and $N_T$ is the number of transmission antennas of the transmitting apparatus 110. The threshold $t^{[q]}$ may vary according to an iteration, or according to the number of transmission antennas of the transmitting apparatus 110.

In addition, the receiving apparatus 120 may determine a set $J_q$ of blocks comprises entries whose power sum is greater than the threshold $t^{[q]}$ in $c^{[q]}$. Herein, the set $J_q$ may include, as elements, indexes of blocks whose power sum is greater than the threshold $t^{[q]}$ in $c^{[q]}$. In other words, the set $J_q$ may be a subset of the set l={0, 1, . . . , L−1, . . . , $N_R(N_T-1)L-1$ . . . , $N_R N_T L-1$}. In addition, indexes included in the set $J_q$ may be the same as significant channel tap indexes of the CIR or may be a portion of the significant channel tap indexes. In other words, the set $J_q$ may include all or some of the significant channel tap indexes of the CIR as an element.

The operations of the receiving apparatus 120 determining the blocks whose power sum is greater than the threshold $t^{[q]}$ in $c^{[q]}$, and the set $J_q$ of the blocks, and determining the set of indexes of the entries included in the block comprising entries whose power sum is greater than the threshold $t^{[q]}$ may be performed in a hard threshold/subset selection block 820 of the receiving apparatus 120.

The receiving apparatus 120 may determine a union $I_q$ of the set $J_q$ and the set $I_{q-1}$. A null set $I_0 = \emptyset$ may be defined in the first iteration (q=1). In other words, the set $I_q$ in the q-th iteration may be a cumulative set in which elements of $J_q$ determined in each iteration are accumulated. Accordingly, the set $I_q$ may also be a subset of the set $1 = \{0, 1, \ldots, L-1, \ldots, N_R(N_T-1)L-1 \ldots, N_R N_T L-1\}$. The operation of the receiving apparatus 120 determining the union $I_q$ of the set $J_q$ and the set $I_{q-1}$ may be performed by a union unit 830.

The receiving apparatus 120 may perform zero-forcing with respect to the received CRS vector y. To perform zero-forcing, the receiving apparatus 120 may determine a new system matrix $X_{I_q}$ which is formed of column vectors corresponding to block indexes included in the set $I_q$ in the system matrix X. The zero-forcing for the received $CRS_y$ may be performed in a zero-forcing unit 840 of the receiving apparatus 120. A resulting value of the zero-forcing of the received CRS y may be defined as $$\hat{h}_{I_q}$$

and $$\hat{h}_{I_q}$$

may be expressed as shown in Equation 4 presented below:

$$\hat{h}_{I_q} = (X_{I_q}^H X_{I_q})^{-1} X_{I_q}^H y \quad \text{Equation 4}$$

where y is a received CRS signal, and $X_{I_q}$ is a new system matrix which is formed of column vectors corresponding to indexes included in the set $I_q$ in the system matrix X. $\hat{h}_{I_q}$ is a result of performing zero-forcing with respect to the received CRS signal y, and is an estimate of CIR in which a channel tap value corresponding to an index included in the set $I_q$ is greater than or equal to a threshold (or is not zero), and a channel tap value corresponding an index not included in the set $I_q$ is less than the threshold (for example, is zero (0)). The set $I_q$ determined in the q-th iteration may include only some of the significant channel tap indexes of the CIR. Accordingly, $$\hat{h}_{I_q}$$

may include only some of all significant channel tap values. Through many iterations, the sets $I_q$ and $$\hat{h}_{I_q}$$

may be refined, and $\hat{h}$ determined in the final iteration may be a complete CIR including all significant channel tap values. According to various embodiments of the present disclosure, the iteration may be repeated Q times. Herein, Q is a pre-set value and may be q when a power $\|\varepsilon^{[q]}\|^2$ of a residual vector is smaller than a reference value, or may be q when a component value having the greatest norm value from among the component values of the signal $c^{[q]}$ passing through the matched filter 810 is smaller than the reference value. The set $I_Q$ determined in the final iteration Q may include all significant channel tap indexes of the CIR as elements. Accordingly, in the CIR $\hat{h}$ determined in the final iteration Q, a channel tap value corresponding to an index included in the set $I_Q$ is greater than or equal to the threshold (or is not zero (0)), and a channel tap value corresponding to an index not included in the set $I_Q$ may be less than the threshold (for example, is zero (0)).

When the iteration is repeated, the input signal to the matched filter 810 in iteration other than the first iteration may be a signal excluding interference by the estimate of CIR $\hat{h}_{I_q}$ determined in the previous iteration from the received CRS y. The interference by the estimate of CIR $\hat{h}_{I_q}$ ion the CRS y may be determined in an interference construction block 850 of the receiving apparatus 120, and may be expressed by $$X_{I_q} \hat{h}_{I_q}.$$

Accordingly, the input signal to the matched filter 810 in iterations other than the first iteration may be expressed by $$y - X_{I_q} \hat{h}_{I_q}.$$

As described above, the CIR ($\hat{h}$) and the set ($I_Q$) of the significant channel tap indexes of the CIR may be determined according to the block StOMP algorithm 800. Hereinafter, a detailed operation of determining an effective CFR based on significant channel tap indexes of a CIR and the CIR will be described with reference to FIGS. 9 and 10.

Figure 9:
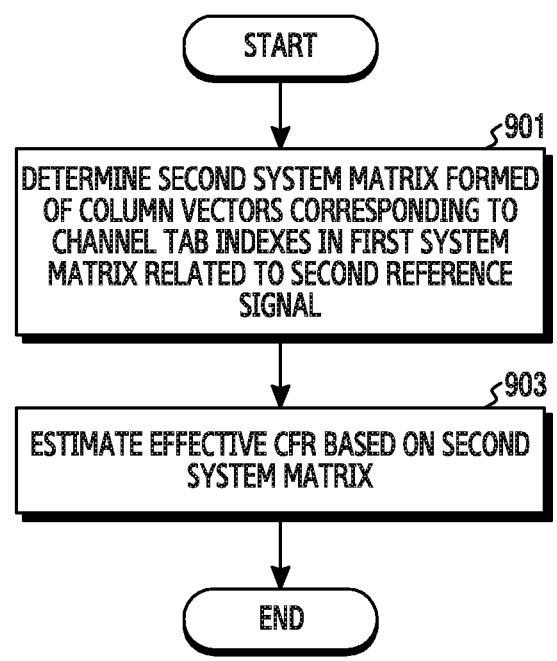
FIG. 9 illustrates an operation flowchart of a receiving apparatus for estimating an effective CFR based on a new system matrix related to a DMRS in a wireless communication system according to various embodiments of the present disclosure.

FIG. 9 illustrates an operation flowchart of the receiving apparatus 120 estimating an effective CFR based on a new system matrix related to a DMRS according to various embodiments of the present disclosure.

Referring to FIG. 9, in step 901, the receiving apparatus 120 may determine a second system matrix which is formed of column vectors corresponding to channel tap indexes in a first system matrix related to a second reference signal. For example, the second reference signal may include a DMRS and the first system matrix may be a system matrix regarding the DMRS. The receiving apparatus 120 may determine significant channel tap indexes of a CIR, and may extract column vectors of the same index as the significant channel tap index of the CIR from the first system matrix, and then, may determine the second system matrix which is formed of the extracted column vectors.

In step 903, the receiving apparatus 120 may estimate an effective CFR based on the second system matrix. According to various embodiments of the present disclosure, estimating the effective CFR by using the second system matrix may correspond to using only channel tap values corresponding to significant channel tap indexes of the CIR in the effective CIR to estimate the effective CFR. The receiving apparatus 120 may use a regularized ML method to estimate the effective CFR based on the second system matrix. A PDP regarding channel tap values corresponding to the significant channel tap indexes of the CIR in the effective CIR may be uniform or may exponentially decay. When the PDP regarding the channel tap values corresponding to the significant channel tap indexes of the CIR in the effective CIR exponentially decays, the receiving apparatus 120 may use an LMMSE method to estimate the effective CFR.

Figure 10:
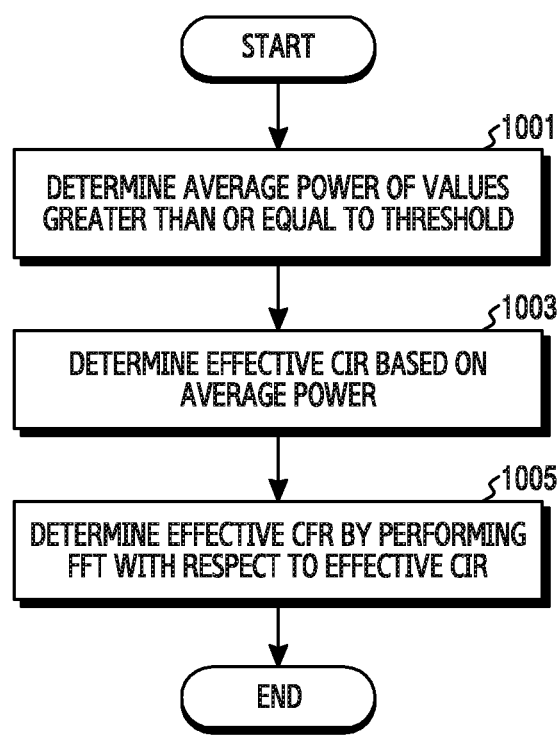
FIG. 10 illustrates an operation flowchart of a receiving apparatus for estimating an effective CFR based on powers of channel tap values greater than or equal to a threshold in a CIR in a wireless communication system according to various embodiments of the present disclosure.

FIG. 10 illustrates an operation flowchart of the receiving apparatus 120 estimating an effective CFR based on powers of channel tap values greater than or equal to a threshold in a CIR according to various embodiments of the present disclosure.

Referring to FIG. 10, in step 1001, the receiving apparatus 120 may determine an average power regarding channel tap values greater than or equal to a threshold in a CIR. In other words, the receiving apparatus 120 may determine an average power regarding significant channel tap values of the CIR, rather than determining an average power regarding all channel tap values of the CIR.

In step 1003, the receiving apparatus 120 may determine an effective CIR based on the average power determined in step 1001. The receiving apparatus 120 may use a CRS to determine an effective CIR regarding a DMRS, and may determine the effective CIR by using an average power regarding significant channel tap values of the CIR to the CRS.

In step 1005, the receiving apparatus 120 may determine an effective CFR by performing FFT with respect to the effective CIR. When the effective CIR and the effective CFR are expressed in the form of a matrix, the effective CFR may be a result of multiplying the effective CIR with an FFT matrix.

In FIGS. 9 and 10, the receiving apparatus 120 may selectively use the second system matrix (=system matrix formed of column vectors corresponding to significant channel tap indexes of the CIR in the system matrix regarding the DMRS), or the average power regarding the significant channel tap values of the CIR to determine the effective CFR. However, this is merely an example, and the receiving apparatus 120 may use both the second system matrix and the average power regarding the significant channel tap values of the CIR to determine the effective CFR. In other words, the receiving apparatus 120 may determine the effective CFR based on at least one of the second system matrix and the average power regarding the significant channel tap values of the CIR.

Hereinafter, effects achieved when the receiving apparatus 120 estimates an effective CFR based on significant channel values of a CIR and significant channel tap indexes according to various embodiments of the present disclosure will be described with reference to FIG. 11.

Figure 11:
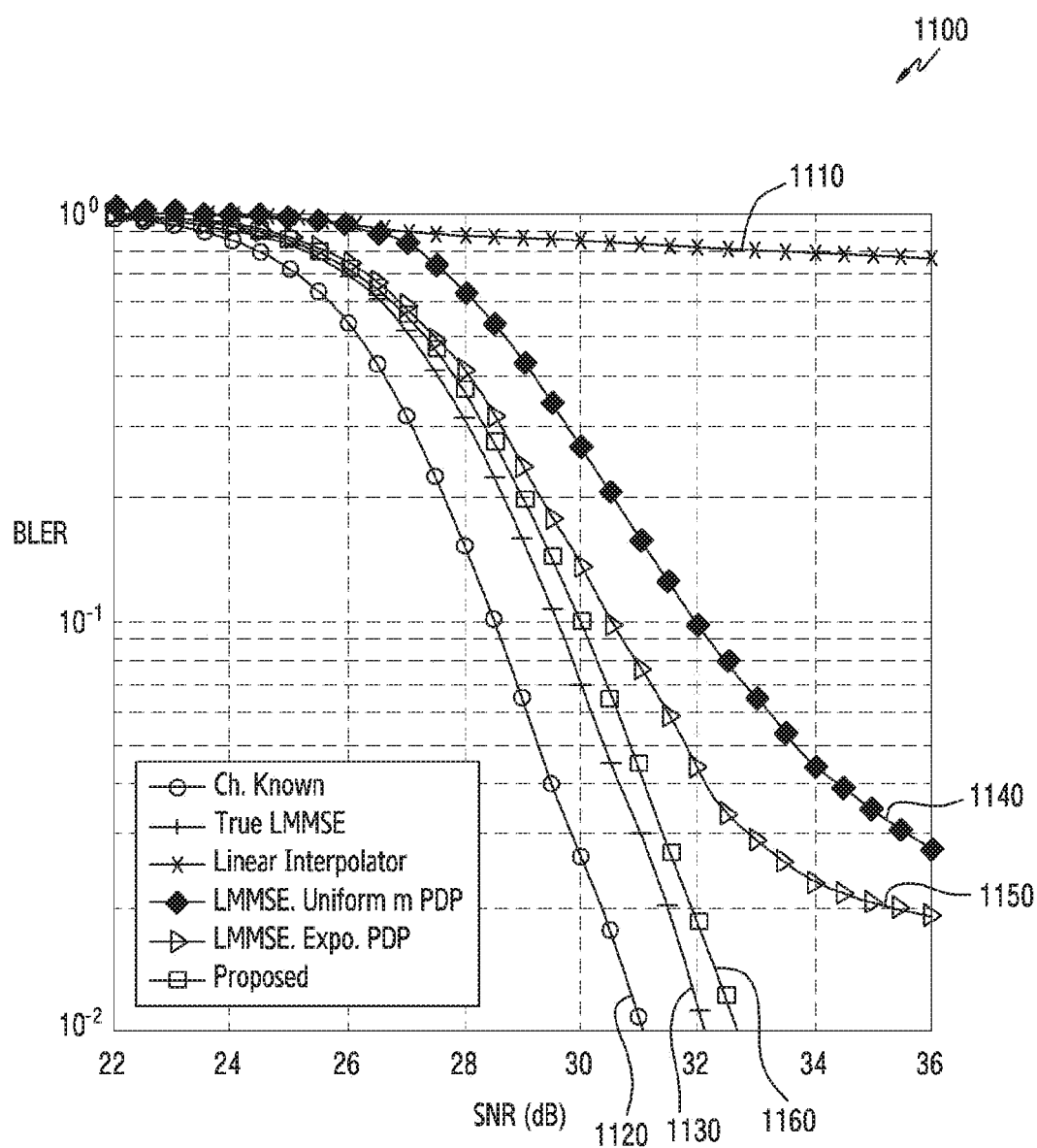
FIG. 11 is a graph showing an effect of channel estimation according to various embodiments of the present disclosure.

FIG. 11 is a graph 1100 illustrating effects of channel estimation according to various embodiments of the present disclosure. In FIG. 11, the horizontal axis of the graph 1100 indicates an SNR in a decibel (dB) unit, and the vertical axis indicates a BLER. In the graph 1100, curved lines 1110, 1120, 1130, 1140, 1150, and 1160 may show a relationship between the SNR and the BLER regarding an effective channel.

The curved line 1110 indicates a relationship between the BLER and the SNR when an effective channel for a received DMRS is estimated based on linear interpolation. According to the curved line 1110, since the BELR is relatively high in a high SNR region, the receiving apparatus 120 may achieve high performance when an effective channel is estimated based on linear interpolation.

The curved line 1120 indicates a relationship between the BLER and the SNR when an effective channel already determined between the transmitting apparatus 110 and the receiving apparatus 120 rather than the effective channel estimated by the receiving apparatus 120 is assumed. The curved line 1130 indicates a relationship between the BLER and the SNR when an effective channel is estimated based on the real LMMSE method. According to the curved lines 1120 and 1130, the curved lines 1120 and 1130 do not include an inflection point, and the receiving apparatus 120 may reduce the BLER as much as an increase rate of the SNR even in a high SNR region (for example, an SNR ranging from 30 to 32 dB).

The curved line 1140 indicates a relationship between the BLER and the SNR when it is assumed that a PDP regarding channel tap values corresponding to all channel tap indexes of an effective CIR is uniform. The curved line 1150 indicates a relationship between the BLER and the SNR when it is assumed that the PDP regarding the channel tap values corresponding to all channel tap indexes of the effective CIR exponentially decays. According to the curved lines 1140 and 1150, since the curved lines 1140 and 1150 include an inflection point, the receiving apparatus 120 may not reduce the BELR as much as an increase rate of the SNR in a high SNR region (for example, an SNR ranging from 34 to 36 dB). In other words, when the receiving apparatus 120 estimates the effective channel on the assumption that the PDP regarding the channel tap values corresponding to all channel tap indexes of the effective CIR is uniform or exponentially decays, an error floor phenomenon may occur in the high SNR region.

The curved line 1160 indicates a relationship between the BLER and the SNR when the receiving apparatus 120 estimates an effective channel by using only channel tap values corresponding to significant channel tap indexes of a CIR in an effective CIR according to various embodiments of the present disclosure. For example, the curved line 1160 may indicate a relationship between the BLER and the SNR when it is assumed that a PDP regarding the channel tap values corresponding to the significant channel tap indexes of the CIR in the effective CIR is uniform or exponentially decays. According to the curved line 1160, the curved line 1160 does not include an inflection point, and the receiving apparatus 120 may reduce the BLER as much as an increase rate of the SNR even in a high SNR region. In other words, unlike the curved lines 1140 and 1150, when the receiving apparatus 120 estimates the effective channel by using only the channel tap values corresponding to the significant channel tap indexes of the CIR in the effective CIR according to various embodiments of the present disclosure, an error floor phenomenon does not occur even in a high SNR region.

Hereinafter, a method for estimating an effective CFR according to various embodiments of the present disclosure will be described with specific mathematical algorithms.

As described in FIG. 2, since a DMRS and a CRS are transmitted via the same transmission antenna of the transmitting apparatus 110, it may be deemed that the DMRS and the CRS are received by the receiving apparatus 120 via the same multi-path. Accordingly, there may exist a specific relationship between a channel tap value of an effective CIR to the DMRS and a channel tap value of a CIR to the CRS, and specifically, a relationship as shown in Equation 5 presented below may exist:

$$g_{u',v}(l) = \sum_{u=0}^{N_t-1} p_{u',u} h_{u,v}(l) \quad \text{Equation 5}$$

where l is a channel tap index, $h_{u,v}(l)$ is a channel tap value of a CIR in the channel tap index l related to a CRS antenna port u of the transmitting apparatus 110 and a reception antenna v of the receiving apparatus 120, and $p_{u',u}$ is a precoder coefficient related to a DMRS port u' of the transmitting apparatus 110 and the CRS port u of the transmitting apparatus 110, and may indicate an effect achieved by applying the same beamforming to the DMRS and data multiplexed with the DMRS in comparison to the CRS. In addition, $N_t$ is the number of transmission antennas of the transmitting apparatus 110, and $g_{u',v}$ (l) is a channel tap value of an effective CIR in the channel tap index l related to the DMRS port u' of the transmitting apparatus 110 and the reception antenna v of the receiving apparatus 120. According to Equation 5, the effective CIR may be expressed as shown in Equation 6 presented below:

$$g_{u',v} = [g_{u',v}(0), \ldots, g_{u',v}(L-1)]^T \quad \text{Equation 6}$$

where $g_{u',v}$ is an effective CIR related to a DMRS port u' of the transmitting apparatus 110 and a reception antenna v of the receiving apparatus 120, and $g_{u',v}(l)$ (l=0, 1, ..., L−1) is a channel tap value of the effective CIR in the channel tap index l related to the DMRS port u' of the transmitting apparatus 110 and the reception antenna v of the receiving apparatus 120. A relationship among the effective CIR expressed as shown in Equation 6, a DMRS decoded (for example, Walsh decodered) by a code corresponding to the receiving apparatus 120, and a system matrix regarding the DMRS may be expressed as shown in Equation 7 presented below:

$$y_{u',v} = F_{u'} g_{u',v} + w_{u',v} \quad \text{Equation 7}$$

where $y_{u',v}$ is a DMRS related to a DMRS port u' of the transmitting apparatus 110 and a reception antenna v of the receiving apparatus 120, $F_{u'}$ is a system matrix regarding the DMRS related to the DMRS port u' of the transmitting apparatus 110, $g_{u',v}$ is an effective CIR related to the DMRS port u' of the transmitting apparatus 110 and the reception antenna v of the receiving apparatus 120, and $W_{u',v}$ is a noise signal to the DMRS related to the DMRS port u' of the transmitting apparatus 110 and the reception antenna v of the receiving apparatus 120.

Since an effective CFR is a result of performing FFT with respect to the effective CIR, a relationship between the effective CFR and the effective CIR may be expressed as shown in Equation 8 presented below:

$$\gamma_{u',v} = \Phi g_{u',v} \quad \text{Equation 8}$$

where $\gamma_{u',v}$ is an effective CFR related to the DMRS port u' of the transmitting apparatus 110 and the reception antenna v of the receiving apparatus 120, and regarding a PRB to which the same beamforming is applied, $\Phi$ is a submatrix of FFT, and $g_{u',v}$ is an effective CIR related to the DMRS port u' of the transmitting apparatus 110 and the reception antenna v of the receiving apparatus 120.

The effective CFR may be estimated based on an ACF regarding the effective CFR. The ACF regarding the effective CFR may be expressed as shown in Equation 9 presented below:

$$r_\gamma(k) = E[\gamma_{u',v}(p)\gamma^*_{u',v}(p-k)] \quad \text{Equation 9}$$

where k is a subcarrier index, $\gamma_{u',v}$ is an effective CFR related to the DMRS port u' of the transmitting apparatus 110 and the reception antenna v of the receiving apparatus 120, and $r_\gamma(k)$ is a correlation value between two effective CFRs where subcarrier index is spaced apart by k.

When a PDP regarding channel tap values corresponding to all channel tap indexes of the effective CIR is uniform, the ACF of the effective CFR may be expressed as shown in Equation 10 presented below:

$$r_\gamma(k) = r_\gamma(0) \frac{e^{j2\pi k \tau_\mu / N} \sin(\pi Tk/N)}{\pi Tk/N} \quad \text{Equation 10}$$

where k is a subcarrier index, and T is a maximum delay time section of multi-path and may be expressed by $T = \sqrt{12}\tau_{rm\,s}$. $\tau_{rm\,s}$ is a root mean square delay (RMS delay) of an effective channel. In addition, $\tau_\mu$ may be defined as $\tau_\mu = \tau_0 + T/2$, and $\tau_0$ is a delay time of a path that has the shortest delay from the multi-path. $r_\gamma(k)$ is a correlation value between two effective CFRs where subcarrier index is spaced apart by k, and $\gamma_{u',v}$ is an effective CFR related to the DMRS port u' of the transmitting apparatus 110 and the reception antenna v of the receiving apparatus 120.

In addition, when the PDP regarding the channel tap values corresponding to all channel tap indexes of the effective CIR exponentially decays, the ACF of the effective CFR may be expressed as shown in Equation 11 presented below:

$$r_\gamma(k) = r_\gamma(0) \frac{e^{-\tau_0 \left(\frac{j2\pi k}{n}\right)}}{1 + j2\pi \tau_{rms} k / N} \quad \text{Equation 11}$$

where k is a subcarrier index, and $\tau_{rm\,s}$ is an RMS delay of an effective channel. $\tau_0$ is a delay time of a path that has the shortest delay from the multi-path and satisfies relational expression $\tau_0 = \tau_\mu - \tau_{rm\,s}$. Herein, $\tau_\mu$ is an average delay time of multi-path. $r_\gamma(k)$ is a correlation value between two effective CFRs where subcarrier index is spaced apart by k.

As shown in Equation 10 and Equation 11, $\tau_\mu$ and $\tau_{rm\,s}$ are used to determine the ACF of the effective CFR when the PDP regarding the channel tap values corresponding to all channel tap indexes of the effective CIR is uniform or exponentially decays. Estimate values $\hat{\tau}_\mu$ and $\hat{\tau}_{rm\,s}$ of $\tau_\mu$ and $\tau_{rm\,s}$ may be determined by the receiving apparatus 120 using a received CRS, and may be expressed as shown in Equation 12 presented below:

$$\hat{\tau}_\mu = -\frac{N\angle R(l)}{2\pi\Delta_{crs}} \quad \text{Equation 12}$$

$$\hat{\tau}_{rms} = \frac{N}{2\pi\Delta_{crs}} \sqrt{2\left[1 - \frac{|R(1)|}{R(0)}\right]}$$

where $\Delta_{crs}$ is a subcarrier spacing of a CRS, $\hat{\tau}_{rm\,s}$ is an estimate value regarding the RMS delay ($\tau_{rm\,s}$) of the effective channel, and $\hat{\tau}_\mu$ is an estimate value regarding the average delay time ($\tau_\mu$) of multi-path. In Equation 12, R(0) and R(1) may be determined by Equation 13 presented below:

$$R(0) = \left\langle |y_{u,v}(n,k)|^2 \right\rangle - \sigma_z^2$$

$$R(1) = \left\langle y_{u,v}(n,(k+\Delta_{crs})_N)(y_{u,v}(n,k))^* \right\rangle \quad \text{Equation 13}$$

where n is a symbol index, k is a subcarrier index, $y_{u,v}(n,k)$ is a CRS related to the CRS port u of the transmitting apparatus 110 and the reception antenna v of the receiving apparatus 120 in the symbol index n and the subcarrier index k, $\sigma_z^2$ is a variance of a noise signal regarding the CRS, and $\Delta_{crs}$ is a subcarrier spacing of the CRS.

The effective CFR may be determined based on the ACF regarding the effective CFR and an approximate LMMSE method. Specifically, the effective CFR may be expressed as shown in Equation 14 presented below according to Equation 9:

$$\hat{\gamma}_{u',v}(k) = E[\gamma_{u',v}(k)(y_{u',v})^H] \cdot (E[y_{u',v}(y_{u',v})^H])^{-1} y_{u',v} \quad \text{Equation 14}$$

$$= [r_\gamma(k-q_0), r_\gamma(k-q_0-5), r_\gamma(k-q_0-10)] \cdot \begin{bmatrix} r_\gamma(0) + \sigma_w^2 & r_\gamma^*(5) & r_\gamma^*(10) \\ r_\gamma(5) & r_\gamma(0) + \sigma_w^2 & r_\gamma^*(5) \\ r_\gamma(10) & r_\gamma(5) & r_\gamma(0) + \sigma_w^2 \end{bmatrix}^{-1} y_{u',v}$$

where k is a subcarrier index, $q_0$ is a subcarrier index of a lowest DMRS in a considered PRB, $\hat{\gamma}_{u',v}(k)$ is an estimate value of an effective CFR related to the DMRS port u' of the transmitting apparatus 110 and the reception antenna v of the receiving apparatus 120 in the subcarrier k, $\gamma_{u',v}(k)$ is an effective CFR related to the DMRS port u' of the transmitting apparatus 110 and the reception antenna v of the receiving apparatus 120 in the subcarrier k, $r_\gamma(k)$ is a correlation value between two effective CFRs where subcarrier index is spaced apart by k, and $\sigma_w^2$ is a variance of a noise signal regarding the DMRS.

Equation 14 expresses an effective CFR estimated when the PDP regarding the channel tap values corresponding to all channel tap indexes of the effective CIR is uniform or exponentially decays. In other words, Equation 14 expresses an effective CFR estimated when channel tap values corresponding to all channel tap indexes of the effective CIR are considered. However, according to various embodiments of the present disclosure, only the channel tap values corresponding to the significant channel tap indexes of the CIR in the effective CIR may be considered in estimating the effective CFR. In other words, the receiving apparatus 120 may estimate the effective CFR based on the PDP regarding the channel values corresponding to the significant channel tap indexes of the CIR in the effective CIR. Herein, the PDP regarding the channel values corresponding to the significant channel tap indexes of the CIR in the effective CIR may be uniform or exponentially decay.

In estimating the effective CFR, a new system matrix $\tilde{F}_{u'}$ regarding the DMRS may be used to consider only the channel tap values corresponding to the significant channel tap indexes of the CIR in the effective CIR. Herein, the new system matrix $\tilde{F}_{u'}$ regarding the DMRS may be a matrix that is formed of only column vectors of $\tilde{F}_{u'}$ corresponding to the significant channel tap indexes of the CIR, and $\tilde{F}_{u'}$ is a system matrix regarding the DMRS related to the DRMS port u' of the transmitting apparatus 110. In other words, considering only the channel tap values corresponding to the significant channel tap indexes of the CIR in the effective CIR to estimate the effective CFR may correspond to estimating the effective CFR by using the new system matrix $\tilde{F}_{u'}$ regarding the DMRS. In addition, the new system matrix $\tilde{F}_{u'}$ regarding the DMRS may be a matrix that is formed of only the column vectors of $F_{u'}$ corresponding to the indexes forming the set $I_Q$ determined by the block StOMP algorithm 800 of FIG. 8. When the number of significant channel tap indexes of the CIR is defined as $L_{sparse}$, the new system matrix $\tilde{F}_{u'}$ regarding the DMRS may be formed of $L_{sparse}$ column vectors.

In addition, according to various embodiments of the present disclosure, in order to consider only the channel tap values corresponding to the significant channel tap indexes of the CIR in the effective CIR in estimating the effective CFR, the receiving apparatus 120 may use an average power regarding the significant channel tap values of the estimate of CIR, rather than an average power regarding all channel tap values of the estimate of CIR. The average power of the significant channel tap values of the estimate of CIR may be expressed as shown in Equation 15 presented below:

$$\sigma_h^2 = \frac{\|\hat{h}\|^2}{N_t N_r L_{sparse}} \quad \text{Equation 15}$$

where $\hat{h}$ is an estimate of CIR, $\|\hat{h}\|^2$ is a power sum regarding all channel tap values of the estimate of CIR, $N_t$ is the number of transmission antennas of the transmitting apparatus 110, $N_r$ is the number of reception antennas of the receiving apparatus, $L_{sparse}$ is the number of significant channel tap indexes of the estimate of CIR, and $\sigma_h^2$ is an average power regarding significant channel tap values of the estimate of CIR.

The receiving apparatus 120 may estimate the effective CFR by using the new system matrix regarding the DMRS, and the average power of the significant channel tap values of the estimate of CIR. In this case, the estimate of effective CFR may be expressed as shown in Equation 16 presented below:

$$\hat{\gamma}_{u',v} = \Phi \hat{g}_{u',v} = \Phi (\tilde{F}_{u'})^H \cdot \left[ \tilde{F}_u (\tilde{F}_{u'})^H + \frac{\sigma_z^2}{\sigma_h^2} I_3 \right]^{-1} y_{u',v} \quad \text{Equation 16}$$

where $\hat{\gamma}_{u',v}$ is an estimate value of an effective CFR related to the DMRS port u' of the transmitting apparatus 110 and the reception antenna v of the receiving apparatus 120, and regarding the PRB to which the same beamforming is applied, $\Phi$ is a submatrix of FFT, $\hat{g}_{u',v}$ is an estimate value of the effective CIR related to the DMRS port u' of the transmitting apparatus 110 and the reception antenna v of the receiving apparatus 120, $\tilde{F}_{u'}$ is a new system matrix regarding the DMRS, which is formed only column vectors of $F_{u'}$ corresponding to significant channel tap indexes of the CIR, $F_{u'}$ is a system matrix regarding the DMRS related to the DMRS port u' of the transmitting apparatus, $\sigma_h^2$ is an average power regarding the significant channel tap values of the estimate of CIR, $\sigma_z^2$ is a variance of a noise signal regarding the CRS, $I_3$ is an identity matrix of a dimension [3×3], and $y_{u',v}$ is a DMRS related to the DMRS port u' of the transmitting apparatus 110 and the reception antenna v of the receiving apparatus 120.

Equation 16 considers only the channel tap values corresponding to the significant channel tap indexes of the CIR in the effective CIR to estimate the effective CFR, and expresses the effective CFR estimated when the PDP regarding the considered channel tap values is uniform. The receiving apparatus 120 may estimate the effective CFR based on the regularized ML method, and, when the PDP regarding the channel tap values corresponding to the significant channel tap indexes of the CIR in the effective CIR is uniform, Equation 16 may indicate the effective CFR estimated by the LMMSE method. In addition, according to various embodiments of the present disclosure, the receiving apparatus 120 may consider only the channel tap values corresponding to the significant channel tap indexes of the CIR in the effective CIR to estimate the effective CFR, and may estimate the effective CFR even when the PDP regarding the considered channel tap values exponentially decays. In this case, the receiving apparatus 120 may estimate the effective CFR based on the LMMSE method. Various embodiments of the present disclosure are not limited by a specific characteristic of the PDP (for example, the uniform PDP or exponentially decaying PDP), and may be applied to any case in which the receiving apparatus 120 estimates the effective CFR based on channel values corresponding to the significant channel tap indexes of the CIR in the effective CIR, regardless of the characteristic of the PDP regarding the channel values corresponding to the significant channel tap indexes of the CIR in the effective CIR.

In various embodiments of the present disclosure, the operations of the receiving apparatus 120 estimating an effective channel based on a CRS and a DMRS received from the transmitting apparatus 110 have been described. However, this is merely an example, and the receiving apparatus 120 may estimate the effective channel based on another reference signal. For example, when the transmitting apparatus 110 is a terminal and the receiving apparatus 120 is a base station, the receiving apparatus 120 may receive a sounding reference signal (SRS) from the transmitting apparatus 110 instead of the CRS, and may estimate the effective channel based on the received SRS and DMRS. The operation of the receiving apparatus 120 estimating the effective channel based on the SRS and the DMRS may be performed by substituting the above-described operations related to the CRS with an operation related to the SRS.

Methods based on the embodiments disclosed in the claims or specification of the present disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the embodiments disclosed in the claims or specification of the present disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to an apparatus which performs the embodiments of the present disclosure. In addition, an additional storage device on a communication network may access to an apparatus which performs the embodiments of the present disclosure.

In the above-described specific embodiments of the present disclosure, elements included in the present disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a reception device in a wireless communication system, the method comprising:
  determining a channel impulse response (CIR) for channel tap indexes based on a cell-specific reference signal (CRS) or a sounding reference signal (SRS);
  identifying significant channel tap indexes of channel tap values among the channel tap indexes, wherein the channel tap values are greater than a threshold among a plurality of channel tap values of the CIR;
  determining an effective CIR for the significant channel tap indexes based on a demodulation reference signal (DMRS); and
  obtaining an effective channel frequency response (CFR) by applying a Fourier transform to the effective CIR.

2. The method of claim 1, wherein determining the effective CIR comprises determining a second system matrix formed of column vectors corresponding to the significant channel tap indexes in a first system matrix related to the DMRS; and
  wherein obtaining the effective CFR comprises determining the effective CFR based on the second system matrix.

3. The method of claim 1, wherein a power delay profile (PDP) of the channel tap values is uniform with respect to the significant channel tap indexes.

4. The method of claim 1, wherein a power delay profile (PDP) of the channel tap values exponentially decays with respect to the significant channel tap indexes as a channel tap index increases.

5. The method of claim 1, further comprising:
  filtering the SRS or the CRS based on a matched filter to obtain a filtered signal;
  determining at least one block comprising entries whose power sum is greater than or equal to a threshold power in the filtered signal;
  determining a second system matrix formed of column vectors corresponding to the at least one block in a first system matrix related to the SRS or CRS;
  performing zero-forcing with respect to the SRS or CRS based on the second system matrix; and determining values greater than or equal to a threshold from among the plurality of channel tap values based on a result of the zero-forcing as the channel tap values.

6. The method of claim 1, wherein determining the effective CIR comprises:
determining an average power of the channel tap values corresponding to the significant channel tap indexes; and
determining the effective CIR based on the average power.

7. The method of claim 1, wherein:
the CRS or the SRS is transmitted from a plurality of transmission antennas of a transmission device, and
the DMRS is transmitted from the plurality of transmission antennas.

8. The method of claim 1, wherein a beamforming applied to the DMRS is a same as a beamforming applied to data multiplexed with the DMRS.

9. A reception device in a wireless communication system, comprising:
a transceiver configured to receive a cell-specific reference signal (CRS) or a sounding reference signal (SRS), and a demodulation reference signal (DMRS); and
at least one processor configured to:
determine a channel impulse response (CIR) for channel tap indexes based on the CRS or SRS,
identify significant channel tap indexes of channel tap values among the channel tap indexes, wherein the channel tap values are greater than a threshold among a plurality of channel tap values of the CIR;
determine an effective CIR for the significant channel tap indexes based on the DMRS; and
obtain an effective channel frequency response (CFR) by applying a Fourier transform to the effective CIR.

10. The reception device of claim 9, wherein the at least one processor is configured to:
determine a second system matrix formed of column vectors corresponding to the significant channel tap indexes in a first system matrix related to the DMRS, and
determine the effective CFR based on the second system matrix.

11. The reception device of claim 9, wherein a power delay profile (PDP) of the channel tap values is uniform with respect to the significant channel tap indexes.

12. The reception device of claim 9, wherein a power delay profile (PDP) of the channel tap values exponentially decays with respect to the significant channel tap indexes as a channel tap index increases.

13. The reception device of claim 9, wherein the at least one processor is configured to:
filter the SRS or the CRS based on a matched filter to obtain a filtered signal;
determine at least one block comprising entries whose power sum is greater than or equal to a threshold power in the filtered signal;
determine a second system matrix formed of column vectors corresponding to the at least one block in a first system matrix related to the SRS or CRS;
perform zero-forcing with respect to the SRS or CRS based on the second system matrix; and
determine values greater than or equal to a threshold from among the plurality of channel tap values based on a result of the zero-forcing as the channel tap values.

14. The reception device of claim 9, wherein the at least one processor is configured to:
determine an average power of the channel tap values corresponding to the significant channel tap indexes; and
determine the effective CIR based on the average power.

15. The reception device of claim 9, wherein:
the CRS or the SRS is transmitted from a plurality of transmission antennas of a transmission device, and
the DMRS is transmitted from the plurality of transmission antennas.

16. The reception device of claim 9, wherein beamforming applied to the DMRS is a same as beamforming applied to data multiplexed with the DMRS.

17. The method of claim 1, wherein the determining of the effective CIR for the significant channel tap indexes comprises:
determining an average power of the channel tap values based on a sum of powers for the plurality of channel tap values of the CIR and a number of the significant channel tap indexes; and
determining the effective CIR for the significant channel tap indexes based on the average power of the channel tap values.

18. The reception device of claim 9, wherein the at least one processor is further configured to:
determine an average power of the channel tap values based on a sum of powers for the plurality of channel tap values of the CIR and a number of the significant channel tap indexes; and
determine the effective CIR for the significant channel tap indexes based on the average power of the channel tap values.

* * * * *